(12) United States Patent
Baldrey et al.

(10) Patent No.: US 8,293,196 B1
(45) Date of Patent: Oct. 23, 2012

(54) ADDITIVES FOR MERCURY OXIDATION IN COAL-FIRED POWER PLANTS

(75) Inventors: Kenneth E. Baldrey, Denver, CO (US);
Sharon Sjostrom, Denver, CO (US);
Nina Bergan French, Napa, CA (US);
Michael D. Durham, Castle Rock, CO (US)

(73) Assignee: ADA-ES, Inc., Littleton, CO (US)

( * ) Notice: Subject to any disclaimer, the term of this patent is extended or adjusted under 35 U.S.C. 154(b) by 0 days.

(21) Appl. No.: 13/198,381

(22) Filed: Aug. 4, 2011

Related U.S. Application Data

(63) Continuation of application No. 11/553,849, filed on Oct. 27, 2006, now Pat. No. 8,124,036.

(60) Provisional application No. 60/730,971, filed on Oct. 27, 2005.

(51) Int. Cl.
*C01G 9/00* (2006.01)
*C01G 11/00* (2006.01)
*C01G 13/00* (2006.01)
*C22B 17/00* (2006.01)
*C22B 19/00* (2006.01)
*C22B 43/00* (2006.01)

(52) U.S. Cl. ....... 423/99; 423/210; 423/213.2; 423/107; 423/462; 95/133; 95/134

(58) Field of Classification Search .............. 423/99, 423/210, 213.2, 107, 462; 95/133, 134; *C01G 9/00, C01G 11/00; C22B 17/00, 19/00, 43/00*
See application file for complete search history.

(56) References Cited

U.S. PATENT DOCUMENTS

| | | |
|---|---|---|
| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |

(Continued)

FOREIGN PATENT DOCUMENTS

AU  2003/220713  2/2004

(Continued)

OTHER PUBLICATIONS

U.S. Appl. No. 11/553,849, filed Oct. 27, 2006, Baldrey et al.

(Continued)

*Primary Examiner* — Jennifer Michener
*Assistant Examiner* — Heng Chan
(74) *Attorney, Agent, or Firm* — Sheridan Ross P.C.

(57) ABSTRACT

The present invention is directed to an additive, primarily for combustion of low sulfur and high alkali coals, that includes a transition metal to impact positively bottom ash slag and optionally a halogen to effect mercury oxidation and collection in the flue gas.

23 Claims, 3 Drawing Sheets

U.S. PATENT DOCUMENTS

| | | |
|---|---|---|
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,955,574 A | 4/1934 | Benner et al. |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 2,844,112 A | 7/1958 | Muller |
| 3,004,836 A | 10/1961 | Thompson |
| 3,194,629 A | 7/1965 | Dreibelbis et al. |
| 3,288,576 A | 11/1966 | Pierron et al. |
| 3,332,755 A | 7/1967 | Kukin |
| 3,437,476 A | 4/1969 | Dotson et al. |
| 3,557,020 A | 1/1971 | Shindo et al. |
| 3,599,610 A | 8/1971 | Spector |
| 3,662,523 A | 5/1972 | Revoir et al. |
| 3,725,530 A | 4/1973 | Kawase et al. |
| 3,764,496 A | 10/1973 | Hultman et al. |
| 3,803,803 A | 4/1974 | Raduly et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,896,746 A | 7/1975 | Pirsh |
| 3,907,674 A | 9/1975 | Roberts et al. |
| 3,932,494 A | 1/1976 | Yoshida et al. |
| 3,947,354 A | 3/1976 | Swanson et al. |
| 3,956,458 A | 5/1976 | Anderson |
| 3,961,020 A | 6/1976 | Seki |
| 3,970,434 A | 7/1976 | Gasior et al. |
| 3,974,254 A | 8/1976 | de la Cuadra Herrera et al. |
| 4,040,802 A | 8/1977 | Deitz et al. |
| 4,042,664 A | 8/1977 | Cardwell et al. |
| 4,051,316 A | 9/1977 | Wing et al. |
| 4,057,398 A | 11/1977 | Bennett |
| 4,075,282 A | 2/1978 | Storp et al. |
| 4,083,783 A | 4/1978 | Wing et al. |
| 4,089,507 A | 5/1978 | Arai et al. |
| 4,094,777 A | 6/1978 | Sugier et al. |
| 4,101,631 A | 7/1978 | Ambrosini et al. |
| 4,115,518 A | 9/1978 | Delmon et al. |
| 4,148,613 A | 4/1979 | Myers |
| 4,173,454 A | 11/1979 | Heins |
| 4,174,373 A | 11/1979 | Yoshida et al. |
| 4,196,173 A | 4/1980 | Dejong et al. |
| 4,226,601 A | 10/1980 | Smith |
| 4,230,460 A | 10/1980 | Maust, Jr. |
| 4,233,274 A | 11/1980 | Allgulin |
| 4,238,329 A | 12/1980 | Zievers |
| 4,272,250 A | 6/1981 | Burk, Jr. et al. |
| 4,273,747 A | 6/1981 | Rasmussen |
| 4,276,431 A | 6/1981 | Schnegg et al. |
| 4,280,817 A | 7/1981 | Chauhan et al. |
| 4,305,726 A | 12/1981 | Brown, Jr. |
| 4,322,218 A | 3/1982 | Nozaki |
| 4,364,818 A | 12/1982 | Schmid et al. |
| 4,372,227 A | 2/1983 | Mahoney et al. |
| 4,377,118 A | 3/1983 | Sadowski |
| 4,377,599 A | 3/1983 | Willard, Sr. |
| 4,385,891 A | 5/1983 | Ligotti |
| 4,387,653 A | 6/1983 | Voss |
| 4,394,354 A | 7/1983 | Joyce |
| 4,420,892 A | 12/1983 | Braun et al. |
| 4,427,630 A | 1/1984 | Aibe et al. |
| 4,438,709 A | 3/1984 | Borio et al. |
| 4,440,100 A | 4/1984 | Michelfelder et al. |
| 4,472,278 A | 9/1984 | Suzuki |
| 4,474,896 A | 10/1984 | Chao |
| 4,498,402 A | 2/1985 | Kober et al. |
| 4,500,327 A | 2/1985 | Nishino et al. |
| 4,514,256 A | 4/1985 | Kober et al. |
| 4,519,807 A | 5/1985 | Nishino et al. |
| 4,519,995 A | 5/1985 | Schrofelbauer et al. |
| 4,527,746 A | 7/1985 | Molls et al. |
| 4,552,076 A | 11/1985 | McCartney |
| 4,555,392 A | 11/1985 | Steinberg |
| 4,564,374 A | 1/1986 | Hofmann |
| 4,572,085 A | 2/1986 | Hepworth |
| 4,577,566 A | 3/1986 | Merrell |
| 4,578,256 A | 3/1986 | Nishino et al. |
| 4,582,936 A | 4/1986 | Ashina et al. |
| 4,586,443 A | 5/1986 | Burge et al. |
| 4,598,652 A | 7/1986 | Hepworth |
| 4,602,918 A | 7/1986 | Steinberg et al. |
| 4,629,721 A | 12/1986 | Ueno |
| 4,668,429 A | 5/1987 | Najjar |
| 4,671,804 A | 6/1987 | Najjar |
| 4,693,731 A | 9/1987 | Tarakad et al. |
| 4,706,579 A | 11/1987 | Merrell |
| 4,708,853 A | 11/1987 | Matviya et al. |
| 4,716,137 A | 12/1987 | Lewis |
| 4,729,882 A | 3/1988 | Ide et al. |
| 4,741,278 A | 5/1988 | Franke et al. |
| 4,753,632 A | 6/1988 | Hofmann et al. |
| 4,758,418 A | 7/1988 | Yoo et al. |
| 4,764,219 A | 8/1988 | Yan |
| 4,765,258 A | 8/1988 | Zauderer |
| 4,784,670 A | 11/1988 | Najjar |
| 4,786,483 A | 11/1988 | Audeh |
| 4,796,548 A | 1/1989 | Merrell et al. |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |
| 4,831,942 A | 5/1989 | Morimoto et al. |
| 4,843,980 A | 7/1989 | Markham et al. |
| 4,873,930 A | 10/1989 | Egense et al. |
| 4,886,519 A | 12/1989 | Hayes et al. |
| 4,886,521 A | 12/1989 | Khan |
| 4,889,698 A | 12/1989 | Moller et al. |
| 4,892,567 A | 1/1990 | Yan |
| 4,915,818 A | 4/1990 | Yan |
| 4,917,862 A | 4/1990 | Kraw et al. |
| 4,919,826 A | 4/1990 | Alzner |
| 4,933,158 A | 6/1990 | Aritsuka et al. |
| 4,936,047 A | 6/1990 | Feldmann et al. |
| 4,964,889 A | 10/1990 | Chao |
| 5,001,994 A | 3/1991 | Morimoto et al. |
| 5,013,358 A | 5/1991 | Ball et al. |
| 5,022,329 A | 6/1991 | Rackley et al. |
| 5,024,171 A | 6/1991 | Krigmont et al. |
| 5,046,265 A | 9/1991 | Kalb |
| 5,049,163 A | 9/1991 | Huang et al. |
| 5,052,312 A | 10/1991 | Rackley et al. |
| 5,116,793 A | 5/1992 | Chao et al. |
| 5,124,135 A | 6/1992 | Girrbach et al. |
| 5,126,300 A | 6/1992 | Pinnavaia et al. |
| 5,137,854 A | 8/1992 | Segawa et al. |
| 5,162,598 A | 11/1992 | Hutchings et al. |
| 5,179,058 A | 1/1993 | Knoblauch et al. |
| 5,190,566 A | 3/1993 | Sparks et al. |
| 5,196,648 A | 3/1993 | Jones |
| 5,202,301 A | 4/1993 | McNamara |
| 5,207,164 A | 5/1993 | Breen et al. |
| 5,238,488 A | 8/1993 | Wilhelm |
| 5,245,120 A | 9/1993 | Srinivasachar et al. |
| 5,282,430 A | 2/1994 | Nehls, Jr. |
| 5,288,306 A | 2/1994 | Aibe et al. |
| 5,307,743 A | 5/1994 | Jones |
| 5,320,051 A | 6/1994 | Nehls, Jr. |
| 5,320,817 A | 6/1994 | Hardwick et al. |
| 5,324,336 A | 6/1994 | Child |
| 5,328,673 A | 7/1994 | Kaczur et al. |
| 5,333,558 A | 8/1994 | Lees, Jr. |
| 5,336,835 A | 8/1994 | McNamara |

| Patent | Date | Inventor |
|---|---|---|
| 5,350,728 A | 9/1994 | Cameron et al. |
| 5,352,647 A | 10/1994 | Suchenwirth |
| 5,354,363 A | 10/1994 | Brown, Jr. et al. |
| 5,357,002 A | 10/1994 | Lezzi et al. |
| 5,364,421 A | 11/1994 | Westby et al. |
| 5,368,617 A | 11/1994 | Kindig |
| 5,372,619 A | 12/1994 | Greinke et al. |
| 5,379,902 A | 1/1995 | Wen et al. |
| 5,403,548 A | 4/1995 | Aibe et al. |
| 5,409,522 A | 4/1995 | Durham et al. |
| 5,435,843 A | 7/1995 | Roy et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,505,746 A | 4/1996 | Chriswell et al. |
| 5,505,766 A | 4/1996 | Chang |
| 5,569,436 A | 10/1996 | Lerner |
| 5,571,490 A | 11/1996 | Bronicki et al. |
| 5,575,982 A | 11/1996 | Reiss et al. |
| 5,587,003 A | 12/1996 | Bulow et al. |
| 5,607,496 A | 3/1997 | Brooks |
| 5,607,654 A | 3/1997 | Lerner |
| 5,618,508 A | 4/1997 | Suchenwirth et al. |
| 5,635,150 A | 6/1997 | Coughlin |
| 5,658,487 A | 8/1997 | Carey et al. |
| 5,659,100 A | 8/1997 | Lin |
| 5,670,122 A | 9/1997 | Zamansky et al. |
| 5,672,323 A | 9/1997 | Bhat et al. |
| 5,674,459 A | 10/1997 | Gohara et al. |
| 5,679,259 A | 10/1997 | Bolser |
| 5,695,726 A | 12/1997 | Lerner |
| 5,733,360 A | 3/1998 | Feldman et al. |
| 5,733,516 A | 3/1998 | DeBerry |
| 5,738,834 A | 4/1998 | DeBerry |
| 5,785,932 A | 7/1998 | Helfritch |
| 5,787,823 A | 8/1998 | Knowles |
| 5,809,910 A | 9/1998 | Svendssen |
| 5,809,911 A | 9/1998 | Feizollahi |
| 5,810,910 A | 9/1998 | Ludwig et al. |
| 5,819,672 A | 10/1998 | Radway et al. |
| 5,827,352 A | 10/1998 | Altman et al. |
| 5,855,649 A | 1/1999 | Durham et al. |
| 5,871,703 A | 2/1999 | Alix et al. |
| 5,888,256 A | 3/1999 | Morrison |
| 5,893,943 A | 4/1999 | Durham et al. |
| 5,894,806 A | 4/1999 | Smyrniotis et al. |
| 5,897,688 A | 4/1999 | Voogt et al. |
| 5,899,678 A | 5/1999 | Thomson et al. |
| 5,900,042 A | 5/1999 | Mendelsohn et al. |
| 5,910,292 A | 6/1999 | Alvarez, Jr. et al. |
| 5,972,066 A | 10/1999 | Lehtinen |
| 5,989,506 A | 11/1999 | Markovs |
| 6,024,931 A | 2/2000 | Hanulik |
| 6,027,551 A | 2/2000 | Hwang et al. |
| 6,027,552 A | 2/2000 | Hwang et al. |
| 6,083,289 A | 7/2000 | Ono et al. |
| 6,117,403 A | 9/2000 | Alix et al. |
| 6,132,692 A | 10/2000 | Alix et al. |
| 6,136,281 A | 10/2000 | Meischen et al. |
| 6,136,749 A | 10/2000 | Gadkaree |
| 6,202,574 B1 | 3/2001 | Liljedahl et al. |
| 6,206,685 B1 | 3/2001 | Zamansky et al. |
| 6,221,001 B1 | 4/2001 | Comer et al. |
| 6,240,859 B1 | 6/2001 | Jones, Jr. |
| 6,248,217 B1 | 6/2001 | Biswas et al. |
| 6,250,235 B1 | 6/2001 | Oehr et al. |
| 6,258,334 B1 | 7/2001 | Gadkaree et al. |
| 6,258,456 B1 | 7/2001 | Meyer |
| 6,267,802 B1 | 7/2001 | Baldrey et al. |
| 6,284,199 B1 | 9/2001 | Downs et al. |
| 6,284,208 B1 | 9/2001 | Thomassen |
| 6,294,139 B1 | 9/2001 | Vicard et al. |
| 6,328,939 B1 | 12/2001 | Amrhein |
| 6,368,511 B1 | 4/2002 | Weissenberg et al. |
| 6,372,187 B1 | 4/2002 | Madden et al. |
| 6,375,909 B1 | 4/2002 | Dangtran et al. |
| 6,447,740 B1 | 9/2002 | Caldwell et al. |
| 6,471,506 B1 | 10/2002 | Zamansky et al. |
| 6,475,451 B1 | 11/2002 | Leppin et al. |
| 6,475,461 B1 | 11/2002 | Ohsaki et al. |
| 6,484,651 B1 | 11/2002 | Shepard, Jr. et al. |
| 6,514,907 B2 | 2/2003 | Tsutsumi et al. |
| 6,521,021 B1 | 2/2003 | Pennline et al. |
| 6,524,371 B2 | 2/2003 | El-Shoubary et al. |
| 6,528,030 B2 | 3/2003 | Madden et al. |
| 6,533,842 B1 | 3/2003 | Maes et al. |
| 6,547,874 B2 | 4/2003 | Eck et al. |
| 6,558,454 B1 | 5/2003 | Chang et al. |
| 6,582,497 B1 | 6/2003 | Maes et al. |
| 6,589,318 B2 | 7/2003 | El-Shoubary et al. |
| 6,610,263 B2 | 8/2003 | Pahlman et al. |
| 6,613,110 B2 | 9/2003 | Sanyal |
| 6,638,347 B2 | 10/2003 | El-Shoubary et al. |
| 6,638,485 B1 | 10/2003 | Iida et al. |
| 6,649,082 B2 | 11/2003 | Hayasaka et al. |
| 6,719,828 B1 | 4/2004 | Lovell et al. |
| 6,726,888 B2 | 4/2004 | Lanier et al. |
| 6,729,248 B2 | 5/2004 | Johnson et al. |
| 6,732,055 B2 | 5/2004 | Bagepalli et al. |
| 6,737,031 B2 | 5/2004 | Beal et al. |
| 6,773,471 B2 | 8/2004 | Johnson et al. |
| 6,787,742 B2 | 9/2004 | Kansa et al. |
| 6,790,420 B2 | 9/2004 | Breen et al. |
| 6,790,429 B2 | 9/2004 | Ciampi |
| 6,808,692 B2 | 10/2004 | Oehr |
| 6,827,837 B2 | 12/2004 | Minter |
| 6,841,513 B2 | 1/2005 | El-Shoubary et al. |
| 6,848,374 B2 | 2/2005 | Srinivasachar et al. |
| 6,864,008 B2 | 3/2005 | Otawa et al. |
| 6,878,358 B2 | 4/2005 | Vosteen et al. |
| 6,916,762 B2 | 7/2005 | Shibuya et al. |
| 6,942,840 B1 | 9/2005 | Broderick |
| 6,945,925 B2 | 9/2005 | Pooler et al. |
| 6,953,494 B2 | 10/2005 | Nelson, Jr. |
| 6,960,329 B2 | 11/2005 | Sellakumar |
| 6,962,617 B2 | 11/2005 | Simpson |
| 6,969,494 B2 | 11/2005 | Herbst |
| 6,972,120 B2 | 12/2005 | Holste et al. |
| 6,974,562 B2 | 12/2005 | Ciampi et al. |
| 6,974,564 B2 | 12/2005 | Biermann |
| 6,975,975 B2 | 12/2005 | Fasca |
| 7,118,720 B1 | 10/2006 | Mendelsohn et al. |
| 7,141,091 B2 | 11/2006 | Chang |
| 7,151,199 B2 | 12/2006 | Martens et al. |
| 7,153,481 B2 | 12/2006 | Bengtsson et al. |
| 7,156,959 B2 | 1/2007 | Herbst |
| 7,250,387 B2 | 7/2007 | Durante et al. |
| 7,312,300 B2 | 12/2007 | Mitchell |
| 7,331,533 B2 | 2/2008 | Bayer et al. |
| 7,332,002 B2 | 2/2008 | Johnson et al. |
| 7,361,209 B1 | 4/2008 | Durham et al. |
| 7,381,380 B2 | 6/2008 | Herbst |
| 7,381,387 B2 | 6/2008 | Lissianski et al. |
| 7,384,615 B2 | 6/2008 | Boardman et al. |
| 7,387,719 B2 | 6/2008 | Carson et al. |
| 7,413,719 B2 | 8/2008 | Digdon |
| 7,416,137 B2 | 8/2008 | Hagen et al. |
| 7,435,286 B2 | 10/2008 | Olson et al. |
| 7,452,392 B2 | 11/2008 | Nick et al. |
| 7,473,303 B1 | 1/2009 | Higgins et al. |
| 7,476,324 B2 | 1/2009 | Ciampi et al. |
| 7,479,215 B2 | 1/2009 | Carson et al. |
| 7,479,263 B2 | 1/2009 | Chang et al. |
| 7,494,632 B1 | 2/2009 | Klunder |
| 7,507,083 B2 | 3/2009 | Comrie |
| 7,514,052 B2 | 4/2009 | Lissianski et al. |
| 7,517,445 B2 | 4/2009 | Carson et al. |
| 7,517,511 B2 | 4/2009 | Schofield |
| 7,524,473 B2 | 4/2009 | Lindau et al. |
| 7,531,708 B2 | 5/2009 | Carson et al. |
| 2002/0068030 A1 | 6/2002 | Nolan et al. |
| 2002/0114749 A1 | 8/2002 | Cole |
| 2002/0121482 A1 | 9/2002 | Ciampi et al. |
| 2003/0065236 A1 | 4/2003 | Vosteen et al. |
| 2003/0079411 A1 | 5/2003 | Kansa et al. |
| 2003/0164309 A1 | 9/2003 | Nakamura et al. |
| 2003/0166988 A1 | 9/2003 | Hazen et al. |
| 2003/0206843 A1 | 11/2003 | Nelson, Jr. |

| | | | | | | |
|---|---|---|---|---|---|---|
| 2004/0013589 | A1 | 1/2004 | Vosteen et al. | EP | 1199354 | 4/2002 |
| 2004/0016377 | A1 | 1/2004 | Johnson et al. | EP | 1271053 | 1/2003 |
| 2004/0129607 | A1 | 7/2004 | Slater et al. | EP | 1386655 | 2/2004 |
| 2004/0256247 | A1 | 12/2004 | Carson et al. | EP | 1570894 | 9/2005 |
| 2005/0020828 | A1 | 1/2005 | Therkelsen | FR | 1394547 | 4/1965 |
| 2005/0026008 | A1 | 2/2005 | Heaton et al. | FR | 1394548 | 4/1965 |
| 2005/0036926 | A1* | 2/2005 | Lissianski et al. ............ 423/210 | GB | 1121845 | 7/1968 |
| 2005/0039598 | A1 | 2/2005 | Srinivasachar et al. | GB | 2122916 | 1/1984 |
| 2005/0056548 | A1 | 3/2005 | Minter | HU | 0202095 | 6/2004 |
| 2005/0090379 | A1 | 4/2005 | Shibuya et al. | JP | 49-53590 | 5/1974 |
| 2005/0118084 | A1 | 6/2005 | Cichanowicz | JP | 49-53591 | 5/1974 |
| 2005/0132880 | A1 | 6/2005 | Chang | JP | 49-53592 | 5/1974 |
| 2006/0027488 | A1 | 2/2006 | Gauthier | JP | 49-53593 | 5/1974 |
| 2006/0029531 | A1 | 2/2006 | Breen et al. | JP | 49-53594 | 5/1974 |
| 2006/0051270 | A1 | 3/2006 | Brunette | JP | 49-66592 | 6/1974 |
| 2006/0124444 | A1 | 6/2006 | Nakamura et al. | JP | 51-5586 | 1/1976 |
| 2006/0185226 | A1 | 8/2006 | McDonald et al. | JP | 59-10343 | 1/1984 |
| 2006/0204418 | A1 | 9/2006 | Chao et al. | JP | 59-76537 | 5/1984 |
| 2006/0205592 | A1 | 9/2006 | Chao et al. | JP | 59-160534 | 9/1984 |
| 2007/0051239 | A1 | 3/2007 | Holmes et al. | JP | 63-100918 | 5/1988 |
| 2007/0156288 | A1 | 7/2007 | Wroblewski et al. | JP | 09-239265 | 9/1997 |
| 2007/0167309 | A1 | 7/2007 | Olson | JP | 10-109016 | 4/1998 |
| 2007/0179056 | A1 | 8/2007 | Baek et al. | JP | 11-94234 | 4/1999 |
| 2007/0180990 | A1 | 8/2007 | Downs et al. | JP | 2000-197811 | 7/2000 |
| 2007/0184394 | A1 | 8/2007 | Comrie | JP | 2000-205525 | 7/2000 |
| 2008/0060519 | A1 | 3/2008 | Maly et al. | JP | 2000-325747 | 11/2000 |
| 2008/0069749 | A1 | 3/2008 | Liu et al. | JP | 2000-515586 | 11/2000 |
| 2008/0107579 | A1 | 5/2008 | Downs et al. | JP | 2001-347131 | 12/2001 |
| 2008/0115704 | A1 | 5/2008 | Berry et al. | JP | 2002-355031 | 12/2002 |
| 2008/0121142 | A1 | 5/2008 | Comrie | JP | 2003-065522 | 3/2003 |
| 2009/0007785 | A1 | 1/2009 | Kimura et al. | JP | 2004-066229 | 3/2004 |
| 2009/0031929 | A1 | 2/2009 | Boardman et al. | JP | 2005-230810 | 9/2005 |
| 2009/0056538 | A1 | 3/2009 | Srinivasachar et al. | KR | 2004-0010276 | 1/2004 |
| 2009/0081092 | A1 | 3/2009 | Yang et al. | PL | 0354795 | 12/2002 |
| 2009/0104097 | A1 | 4/2009 | Dunson, Jr. | WO | WO 86/04602 | 8/1986 |
| 2009/0117019 | A1 | 5/2009 | Comrie | WO | WO 91/09977 | 7/1991 |
| 2009/0136401 | A1 | 5/2009 | Yang et al. | WO | WO 96/14137 | 5/1996 |
| 2011/0030592 | A1 | 2/2011 | Baldrey et al. | WO | WO 96/30318 | 10/1996 |
| 2011/0195003 | A1 | 8/2011 | Durham et al. | WO | WO 97/17480 | 5/1997 |
| | | | | WO | WO 97/44500 | 11/1997 |
| | | | | WO | WO 98/15357 | 4/1998 |

FOREIGN PATENT DOCUMENTS

| | | |
|---|---|---|
| CA | 1140572 | 2/1983 |
| CA | 2150529 | 12/1995 |
| CA | 2418578 | 8/2003 |
| CA | 2435474 | 1/2004 |
| CN | 1052838 | 7/1991 |
| DE | 2548845 | 5/1976 |
| DE | 2713197 | 10/1978 |
| DE | 2917273 | 11/1980 |
| DE | 3615759 | 11/1987 |
| DE | 3628963 | 3/1988 |
| DE | 3711503 | 10/1988 |
| DE | 3918292 | 4/1990 |
| DE | 4218672 | 8/1993 |
| DE | 4308388 | 10/1993 |
| DE | 4339777 | 5/1995 |
| DE | 4422661 | 1/1996 |
| DE | 19520127 | 12/1996 |
| DE | 19850054 | 5/2000 |
| DE | 10233173 | 7/2002 |
| DE | 10131464 | 1/2003 |
| DE | 60019603 | 4/2006 |
| DK | 409279 | 3/1980 |
| EP | 0009699 | 4/1980 |
| EP | 0115634 | 8/1984 |
| EP | 0208036 | 1/1987 |
| EP | 0220075 | 4/1987 |
| EP | 0254697 | 1/1988 |
| EP | 0433674 | 11/1990 |
| EP | 0433677 | 6/1991 |
| EP | 0435848 | 7/1991 |
| EP | 0628341 | 12/1994 |
| EP | 0666098 | 8/1995 |
| EP | 0709128 | 5/1996 |
| EP | 0794240 | 9/1997 |
| EP | 0908217 | 4/1999 |
| EP | 1040865 | 10/2000 |
| EP | 1077757 | 2/2001 |
| EP | 1213046 | 10/2001 |
| WO | WO 99/58228 | 11/1999 |
| WO | WO 01/28787 | 4/2001 |
| WO | WO 01/38787 | 5/2001 |
| WO | WO 02/093137 | 11/2002 |
| WO | WO 03/093518 | 11/2003 |
| WO | WO 2005/092477 | 10/2005 |
| ZA | 2003-05568 | 7/2004 |

OTHER PUBLICATIONS

U.S. Appl. No. 13/281,040, filed Oct. 25, 2011, Durham et al.
"ADA-ES Tests New Boiler Product," Coal Daily, Apr. 18, 2000, 1 page.
"Bromide," Wikipedia, The Free Encyclopedia, http://en.wikipedia.org/wiki/Bromide (page last modified on May 18, 2011 at 16:53), 3 pages.
"Bromine" webpage, http://www2.gtz.de/uvp/publika/English/vol.318.htm, printed Sep. 14, 2006, 4 pages.
"Bromine," Wikipedia, The Free Encyclopedia, http://en.wikipedia.org/wiki/Bromine (page last modified on Jul. 2, 2011 at 18:46), 12 pages.
"Burning PRB Coals ADA Environmental Offers Flyash Solutions," Western Coal Advisory, Summer/Autumn 1999, 1 page.
"Chlorine" webpage, http://www2.gtz.de/uvp/publika/English/vol324.htm, printed Sep. 14, 2006, 4 pages.
"Control of Mercury Emissions from Coal-Fired Electric Utility Boilers: Interim Report including Errata dated Mar. 21, 2002," prepared by National Risk Management Research Laboratory, U.S. EPA Report EPA-600/R-01-109, Apr. 2002, 485 pages.
"Cyclone Furnaces," Chapter 10 of Steam/Its Generation and Use, Babcock & Wilcox, 1972, 38th Edition, pp. 10-1 to 10-8.
"Disperse" Definition, The American Heritage Dictionary of the English Language, Fourth Edition copyright © 2000 by Houghton Mifflin Company, updated in 2009, as published in thefreedictionary.com at http://www.thefreedictionary.com/disperse, 4 pages.
"DOE Announces Further Field Testing of Advanced Mercury Control Technologies, Six Projects Selected in Round 2 to Address Future Power Plant Mercury Reduction Initiatives," TECHNews From the National Energy Technology Laboratory, Nov. 5, 2004, available at http://www.netl.doe.gov/publications/TechNews/tn_mercury-control.html, printed on Jun. 3, 2009, pp. 1-2.

"DrägerSenor C12-68 08 865 Data Sheet," Dräger Product Information, Apr. 1997, pp. 1-6 (includes English translation).

"Enhanced Mercury Control: KNX™ Coal Additive Technology," Alstom Power Inc., printed Aug. 3, 2006, 1 page.

"Evaluation of Sorbent Injection for Mercury Control at Great River Energy Coal Creek Station," ADA Environmental Solutions, Nov. 16-20, 2003 Final Report, Electric Power Research Institute, issued Mar. 3, 2004, 32 pages.

"Exclusive license agreement for an innovative mercury oxidation technology," Alstom Power Inc., printed Nov. 2, 2006, 1 page.

"Fuel Ash Effects on Boiler Design and Operation," Chapter 21 of Steam/Its Generation and Use, Babcock & Wilcox Company, 2005, 41st Edition, pp. 21-1 to 21-27.

"Fuel-ash Effects on Boiler Design and Operation," Chapter 15 of Steam/Its Generation and Use, Babcock and Wilcox Company, 1972, 38th Edition, pp. 15-1 to 15-26.

"Full-Scale Testing of Enhanced Mercury Control Technologies for Wet FGD Systems: Final Report for the Period Oct. 1, 2000 to Jun. 30, 2002," submitted by McDermott Technology, Inc., May 7, 2003, 151 pages.

"Impregnated Activated Carbon," Products and Technologies Website, as early as 1999, available at http://www.calgoncarbon.com/product/impregnated.html, printed on Dec. 18, 1999, p. 1.

"Incineration: Taking the heat out of complex waste," Bayer Industry Services website, as early as 2005, available at http://web.archive.org/web/20060318115553/www.entsorgung.bayer.com/index.cfm?PAGE_ID=299, printed on Jun. 4, 2009, pp. 1-2.

"Mercury Study Report to Congress—vol. VIII: An Evaluation of Mercury Control Technologies and Costs," U.S. EPA, Office of Air Quality Planning & Standards and Office of Research and Development, Dec. 1997, 207 pages.

"Mercury Study Report to Congress: vol. VIII—An Evaluation of Mercury Control Technologies and Costs," United States Environmental Protection Agency, EPA-452/R-97-010, Dec. 1997, 53 pages.

"Mercury," Pollution Prevention and Abatement Handbook 1998, World Bank Group, effective Jul. 1998, pp. 219-222.

"Protecting Human Health. Mercury Poisoning," US EPA Website, as early as Oct. 8, 1999, available at http://www.epa.gov/region02/health/mercury/, printed on Feb. 5, 2002, pp. 1-4.

"RBHG 4 Combats Mercury Pollution," Know-How, Norit, vol. 6(2), 2003, 3 pages.

"Sample Collection Media: Sorbent Sample Tubes," SKC 1997 Comprehensive Catalog & Air Sampling Guide: The Essential Reference for Air Sampling, pp. 23-24.

"Sodium Hypochlorite," Wikipedia, The Free Encyclopedia, http://en.wikipedia.org/wiki/Sodium_hypochlorite (page last modified on Jul. 7, 2011 at 18:12), 7 pages.

"Speciality Impregnated Carbons," Waterlink/Barnebey Sutcliff, copyright 2000, 5 pages.

"Texas Genco, EPRI, and URS Corporation Test Innovative Mercury Control Method at Limestone Station—Technology Aims to Capture More Mercury from Power Plant Exhaust," News Release, Jan. 11, 2005, available at http://amptest.epri.com/corporate/discover_epri/news/2005/011105_mercury.html, printed on Apr. 24, 2009, pp. 1-2.

"The Fire Below: Spontaneous combustion in Coal," U.S. Department of Energy, Environmental Safety & Health Bulletin, DOE/EH-0320, May 1993, Issue No. 93-4, 9 pages.

Aldrich Chemical Catalog, Aldrich Chemical Co., Inc., 1996, pp. 863-866.

Anders et al., "Selenium in Coal-Fired Steam Plant Emissions," Environmental Science & Technology, 1975, vol. 9, No. 9, pp. 856-858.

Ariya et al., "Reactions of Gaseous Mercury with Atomic and Molecular Halogens: Kinetics, Product Studies, and Atmospheric Implications," J. Phys. Chem. A, 2002, vol. 106(32), pp. 7310-7320.

Bansal et al., Active Carbon, Marcel Dekker, Inc., New York, 1989, pp. 1-3, 24-29, 391-394, 457.

Beer, J. M., "Combustion technology developments in power generation in response to environmental challenges," Progress in Energy and Combustion Science, 2000, vol. 26, pp. 301-327.

Benson et al., "Air Toxics Research Needs: Workshop Findings," Proceedings of the 1993 So2 Control Symposium, U.S. EPA, vol. 2, Session 6A, Aug. 24-27, 1993, pp. 1-17, Boston, MA.

Biswas et al., "Control of Toxic Metal Emissions from Combustors Using Sorbents: A Review," J. Air & Waste Manage. Assoc., Feb. 1998, vol. 48, pp. 113-127.

Biswas et al., "Introduction to the Air & Waste Management Association's 29th Annual Critical Review," Journal of the Air & Waste Management Association, Jun. 1999, pp. 1-2.

Bloom, "Mercury Speciation in Flue Gases: Overcoming the Analytical Difficulties," presented at EPRI Conference, Managing Hazardous Air Pollutants, State of the Arts, Washington D.C., Nov. 1991, pp. 148-160.

Brown et al., "Mercury Measurement and Its Control: What We Know, Have Learned, and Need to Further Investigate," J. Air & Waste Manage. Assoc, Jun. 199, pp. 1-97.

Buschmann et al., "The KNX™ Coal Additive Technology a Simple Solution for Mercury Emissions Control," Alstom Power Environment, Dec. 2005, pp. 1-7.

Bustard et al., "Full-Scale Evaluation of Sorbent Injection for Mercury Control on Coal-Fired Power Plants," Air Quality III, ADA Environmental Solutions, LLC, Arlington, VA, Sep. 12, 2002, 15 pages.

Butz et al., "Options for Mercury Removal from Coal-Fired Flue Gas Streams: Pilot-Scale Research on Activated Carbon, Alternative and Regenerable Sorbents," 17th Annual Int. Pittsburgh Coal Conf. Proceedings, Pittsburgh, PA, Sep. 11-14, 2000, 25 pages.

Calgon Carbon product and bulletin webpages, 11 pages, printed Dec. 18, 1999 and Jul. 1, 2001.

Carey et al., "Factors Affecting Mercury Control in Utility Flue Gas Using Activated Carbon," J. Air & Waste Manage. Assoc., Dec. 1998, vol. 48, pp. 1166-1174.

Chase et al., "JANAF Thermochemical Tables," Journal of Physical and Chemical Reference Data, Third Edition, Part I, vol. 14, Supplement I, 1985, pp. 430, 472, 743.

Cotton and Wilkinson, Advanced Organic Chemistry, Third Edition, 1973, p. 458.

De Vito et al., "Sampling and Analysis of Mercury in Combustion Flue Gas," Presented at the Second International Conference on Managing Hazardous Air Pollutants, Washington, DC, Jul. 13-15, 1993, pp. VII39-VII-65.

Declaration of Richard Schlager; Sep. 18, 2002.

Donnet et al., eds., Carbon Black: Science and Technology, 2nd Edition, Marcel Dekker, New York, 1993, pp. 182-187, 218-219.

Dunham et al., "Investigation of Sorbent Injection for Mercury Control in Coal-Fired Boilers," Energy & Environmental Research Center, University of North Dakota, Sep. 10, 1998, 120 pages.

Durham et al., "Full-Scale Evaluation of Mercury Control by Injecting Activated Carbon Upstream of ESPS," Air Quality IV Conference, ADA Environmental Solutions, Littleton, Colorado, Sep. 2003, 15 pages.

Edwards et al., "A Study of Gas-Phase Mercury Speciation Using Detailed Chemical Kinetics," in Journal of the Air and Waste Management Association, vol. 51, Jun. 2001, pp. 869-877.

Element Analysis of COALQUAL Data; http://energy.er.usgs.gov/temp/1301072102.htm, printed Mar. 25, 2011, 7 pages.

Fabian et al., "How Bayer incinerates wastes," Hydrocarbon Processing, Apr. 1979, pp. 183-192.

Felsvang et al., "Activated Carbon Injection in Spray Dryer/ESP/FF for Mercury and Toxics Control," 1993, pp. 1-35.

Felsvang, K. et al., "Air Toxics Control by Spray Dryer," Presented at the 1993 SO2 Control Symposium, Aug. 24-27, 1993, Boston, MA, 16 pages.

Felsvang, K. et al., "Control of Air Toxics by Dry FGD Systems," Power-Gen '92 Conference, 5th International Conference & Exhibition for the Power Generating Industries, Orlando, FL, Nov. 17-19, 1992, pp. 189-208.

Fujiwara et al., "Mercury transformation behavior on a bench-scale coal combustion furnace," Transactions on Ecology and the Environment, 2001, vol. 47, pp. 395-404.

Galbreath et al., "Mercury Transformations in Coal Combustion Flue Gas," Fuel Processing Technology, 2000, vol. 65-66, pp. 289-310.
Gale et al., "Mercury Speciation as a Function of Flue Gas Chlorine Content and Composition in a 1 MW Semi-Industrial Scale Coal-Fired Facility," In Proceedings of the Mega Symposium and Air & Waste Management Association's Specialty Conference, Washington, DC, May 19-22, 2003, Paper 28, 19 pages.
Gale, "Mercury Adsorption and Oxidation Kinetics in Coal-Fired Flue Gas," Proceedings of the 30th International Technical Conference on Coal Utilization & Fuel Systems, 2005, pp. 979-990.
Gale, "Mercury Control with Calcium-Based Sorbents and Oxidizing Agents," Final Report of Southern Research Institute, Jul. 2005, 137 pages.
Gale, "Mercury Control with Calcium-Based Sorbents and Oxidizing Agents," Southern Research Institute, Mercury Control Technology R&D Program Review Meeting, Aug. 12-13, 2003, 25 pages.
Ganapathy, V., "Recover Heat From Waste Incineration," Hydrocarbon Processing, Sep. 1995, 4 pages.
Geiger et al, "Einfluβ des Schwefels auf Die Doxin—und Furanbuilding bei der Klärschlammverbrennung," VGB Kraftwerkstechnik, 1992, vol. 72, pp. 159-165.
Ghorishi et al., "Effects of Fly Ash Transition Metal Content and Flue Gas HCI/SO2 Ratio on Mercury Speciation in Waste Combustion," in Environmental Engineering Science, Nov. 2005, vol. 22, No. 2, pp. 221-231.
Ghorishi et al., "In-Flight Capture of Elemental Mercury by a Chlorine-Impregnated Activated Carbon," presented at the Air & Waste Management Association's 94h Annual Meeting & Exhibition, Orlando, FL, Jun. 2001, pp. 1-14.
Ghorishi, "Fundamentals of Mercury Speciation and Control in Coal-Fired Boilers," EAP Research and Development, EPA-600/R-98-014, Feb. 1998, pp. 1-26.
Granite et al., "Novel Sorbents for Mercury Removal from Flue Gas," National Energy Technology Laboratory, Apr. 2000, 10 pages.
Granite et al., "Sorbents for Mercury Removal from Flue Gas," U.S. Dept. of Energy, Report DOE/FETC/TR—98-01, Jan. 1998, 50 pages.
Griffin, "A New Theory of Dioxin Formation in Municipal Solid Waste Combustion," Chemosphere, 1986, vol. 15, Nos. 9-12, pp. 1987-1990.
Gullet, B.K. et al, "The Effect of Sorbent Injection Technologies on Emissions of Coal-Based, Based, Metallic Air Toxics," Proceedings of the 1993 S02 Control Symposium, vol. 2, U.S. EPA (Research Triangle Park, NC) Session 6A, Boston, MA, Aug. 24-27, 1993, 26 pages.
Gullett, B. et al., "Bench-Scale Sorption and Desorption of Mercury with Activated Carbon," Presented at the 1993 International Conference on Municipal Waste Combustion, Williamsburg, VA, Mar. 30-Apr. 2, 1993, pp. 903-917.
Gullett, B. et al., "Removal of Illinois Coal-Based Volatile Tracy Mercury," Final Technical Report, Sep. 1, 1996 through Aug. 31, 1997, 2 pages.
Guminski, "The Br-Hg (Bromine-Mercury) System," Journal of Phase Equilibria, Dec. 2000, vol. 21, No. 6, pp. 539-543.
Hall et al., "Chemical Reactions of Mercury in Combustion Flue Gases," Water, Air, and Soil Pollution, 1991, vol. 56, pp. 3-14.
Harlow et al., "Ash Vitrification—A Technology Ready for Transfer," presented at the National Waste Processing Conference, 14th Biennial Conference, Long Beach, CA, Jun. 3-6, 1990, pp. 143-150.
Hein, K.R.G. et al., Research Report entitled, "Behavior of Mercury Emission from Coal Sewage Sludge Co-combustion Taking into Account the Gaseous Species," Förderkennzeichen: PEF 398002, Apr. 2001 (English Abstract).
Henning et al., "Impregnated activated carbon for environmental protection," Gas Separation & Purification, Butterworth-Heinemann Ltd., Feb. 1993, vol. 7(4), pp. 235-240.
Hewlette, Peter C., ed., Lea's Chemistry of Cement and Concrete, Fourth Edition, 1998, pp, 34-35.
Ismo et al., "Formation of Aromatic Chlorinated Compounds Catalyzed by Copper and Iron," Chemosphere, 1997, vol. 34(12), pp. 2649-2662.
Jozewicz et al., "Bench-Scale Scale Investigation of Mechanisms of Elemental Mercury Capture by Activated Carbon," Presented at the Second International Conference on Managing Hazardous Air Pollutants, Washington, D.C., Jul. 13-15, 1993, pp. VII-85 through VII-99.
Julien et al., "The Effect of Halides on Emissions from Circulating Fluidized Bed Combustion of Fossil Fuels," Fuel, Nov. 1996, vol. 75(14), pp. 1655-1663.
Kaneko et al., "Pitting of stainless steel in bromide, chloride and bromide/chloride solutions," Corrosion Science, 2000, vol. 42(1), pp. 67-78.
Kellie et al., "The Role of Coal Properties on Chemical and Physical Transformation on Mercury in Post Combustion," presented at Air Quality IV Conference, Arlington, VA, Sep. 2003, pp. 1-14.
Kilgroe et al. "Fundamental Science and Engineering of Mercury Control in Coal-Fired Power Plants," presented at Air Quality IV Conference, Arlington, VA, Sep. 2003, 15 pages.
Kobayashi, "Japan EnviroChemicals, Ltd. Overview," Feb. 3, 2002, 3 pages.
Kramlich, "The Homogeneous Forcing of Mercury Oxidation to Provide Low-Cost Capture," Abstract, University of Washington, Department of Mechanical Engineering, Mar. 25, 2004, available at http://www.netl.doe.gov/publications/proceedings/04/UCR-HBCU/abstracts/Kramlich.pdf, pp. 1-2.
Krishnan et al., "Mercury Control by Injection of Activated Carbon and Calcium-Based Based Sorbents," Solid Waste Management: Thermal Treatment and Waste-to-Energy Technologies, U.S. EPA and AWMA, Washington, DC, Apr. 18-21, 1995, pp. 493-504.
Krishnan et al., "Mercury Control in Municipal Waste Combustors and Coal Fired Utilities," Environmental Progress, ProQuest Science Journals, Spring 1997, vol. 16, No. 1, pp. 47-53.
Krishnan et al., "Sorption of Elemental Mercury by Activated Carbons," Environmental Science and Technology, 1994, vol. 28, No. 8, pp. 1506-1512.
Lange's Handbook of Chemistry, 14th ed, (1992), pp. 3.22-3.24, McGraw-Hill.
Lee et al., "Mercury Control Research: Effects of Fly Ash and Flue Gas Parameters on Mercury Speciation," U.S. Environmental Protection Agency National Risk Management Research Laboratory and ARCADIS, as early as 1998, Geraghy & Miller, Inc., pp. 221-238, Research Triangle Park, NC.
Lee et al., "Pilot-Scale Study of the Effect of Selective Catalytic Reduction Catalyst on Mercury Speciation in Illinois and Powder River Basin Coal Combustion Flue Gases," J. Air & Waste Manage. Assoc., May 2006, vol. 56, pp. 643-649.
Lemieux et al., "Interactions Between Bromine and Chlorine in a Pilot-Scale Hazardous Waste Incinerator," paper presented at 1996 International Incineration Conference, Savannah, GA, May 6-10, 1996, 14 pages.
Li et al., "Effect of Moisture on Adsorption of Elemental Mercury by Activated Carbons," Report No. EPA/600/A-00/104, U.S. EPA, Office of Research and Development Nation Risk Management, Research Laboratory (10-65), 2000, pp. 1-Li to 13-Li.
Linak et al., "Toxic Metal Emissions from Incineration: Mechanisms and Control," Progress in Energy & Combustion Science, 1993, vol. 19, pp. 145-185.
Lissianski et al., "Effect of Coal Blending on Mercury Removal," presented at the Low Rank Fuels Conference, Billings, MT, Jun. 24-26, 2003, pp. 1-9.
Livengood et al., "Development of Mercury Control Techniques for Utility Boilers," for Presentation at the 88th Air & Waste Management Association Annual Meeting & Exhibit, Jun. 18-23, 1995, pp. 1-14.
Livengood et al., "Enhanced Control of Mercury Emissions Through Modified Speciation," for Presentation at the Air & Waste Management Association's 90th Meeting & Exhibition, Jun. 8-13, 1997, 14 pages.
Livengood et al., "Investigation of Modified Speciation for Enhanced Control of Mercury," Argonne National Laboratory, 1998, available at http://www.netl.doe.gov/publications/proceedings/97/97ps/ps_pdf/PS2B-9.pdf, pp. 1-15.
Luijk et al., "The Role of Bromine in the De Novo Synthesis in a Model Fly Ash System," Chemosphere, 1994, vol. 28, No. 7, pp. 1299-1309.

Martel, K., "Brennstoff-und lastspezifische Untersuchungen zum Verhalten von Schwermetallen in Kohlenstaubfeuerungen [Fuel and load specific studies on the behavior of heavy metals in coal firing systems ]," Fortschritt-Berichte VDI, Apr. 2000, pp. 1-240.

Material Safety Data Sheet for calcium hypochlorite, MSDS, Sciencelab.com. Inc., created Nov. 5, 2005, 6 pages.

Mccoy et al., "Full-Scale Mercury Sorbent Injection Testing at DTE Energy's St. Clair Station," Paper #97, DTE Energy, as early as 2004, pp. 1-9.

Meij et al., "The Fate and Behavior of Mercury in Coal-Fired Power Plants," J. Air & Waste Manage. Assoc., Aug. 2002, vol. 52, pp. 912-917.

Metals Handbook, 9th Edition, Corrosion, vol. 13, ASM International, 1987, pp. 997-998.

Mills Jr., "Techline: Meeting Mercury Standards," as early as Jun. 18, 2001, available at http://www.netl.doe/publications/press/2001/tl_mercuryel2.html, printed on Feb. 5, 2002, pp. 1-3.

Moberg et al., "Migration of Trace Elements During Flue Gas Desulfurization," Report No. KHM-TR-28, Jun. 1982 (abstract only).

Niessen, Combustion and Incineration Processes, 2002, Marcel Dekker, 3rd Edition, p. 25.

Niksa et al., "Predicting Mercury Speciation in Coal-Derived Flue Gases," presented at the 2003 Combined Power Plant Air Pollutant Control Mega Symposium, Washington, D.C., May 2003, pp. 1-14.

Oberacker et al., "Incinerating the Pesticide Ethylene Dibromide (EDB)—A field-Scale Trail Burn Evaluation of Environmental Performance," Report EPA /600/D-88/198, Oct. 1988, pp. 1-11.

Olson et al., "An Improved Model for Flue Gas-Mercury Interactions on Activated Carbons," presented at Mega Symposium May 21, 2003, Energy & Environmental Research Center publication, Paper # 142, pp. 1-8.

Olson et al., "Oxidation Kinetics and the Model for Mercury Capture on Carbon in Flue Gas," presented at Air Quality V Conference, Sep. 21, 2005, pp. 1-7.

Onizuka et al., "Dry-type Desulfurization of Boiler Flue Gases," Hitachi Zosen Corp., Japan, 1990, 1 page abstract.

Oppenheimer et al., "Thermische Entsorgung von Produktionsabfällen," Entsorgungs-Praxis, 2000, vol. 6, pp. 29-33.

Pauling, L., General Chemistry, W.H. Freeman and Company, 1958, pp. 100-106 and 264.

Pavlish et al., "Status Review of Mercury Control Options for Coal-Fired Power Plants," Fuel Processing Technology, Aug. 2003, vol. 82, pp. 89-165.

Perry, Robert H., Perry's Chemical Engineering Handbook, 1997, McGraw-Hill, p. 18-74.

Revised Declaration of Richard Schlager, Aug. 19, 2003.

Richardson et al., "Chemical Addition for Mercury Control in Flue Gas Derived from Western Coals," presented at the 2003 Combined Power Plant Air Pollutant Control Mega Symposium, Washington D.C., May 2003, Paper # 63, pp. 1-16.

Sage et al., "Relationship of Coal-Ash Viscosity to Chemical Composition," Journal of Engineering for Power, Apr. 1960, pp. 145-155.

Samaras et al., "PCDD/F Prevention by Novel Inhibitors: Addition of Inorganic S- and N-Compounds in the Fuel before Combustion," Environmental Science and Technology, 2000, vol. 34, No. 24, pp. 5092-5096.

Senior et al., "Gas-Phase Transformations of Mercury in Coal-Fired Power Plants," Fuel Processing Technology, vol. 63, 2000, pp. 197-213.

Senior, "Behavior of Mercury in Air Pollution Control Devices on Coal-Fired Utility Boilers," Power Production in the 21st Century: Impacts of Fuel Quality and Operations, Engineering Foundation Conference, Snowbird, UT, Oct. 28-Nov. 2, 2001, 17 pages.

Singer, J., ed., "Development of Marine Boilers," Combustion Fossil Power, Combustion Engineering, Inc., Windsor, CT, 1991, pp. 10-4 to 10-14.

Singer, J., ed., Combustion Fossil Power, Combustion Engineering, Inc., 1991, Windsor, CT, pp. 2-1 to 2-44, 3-1 to 3-34, 11-1 to 11-37, 15-1 to 15-76, 16-1 to 16-33, A-1-1 to A-55 and B1-B18.

Sjostrom et al., "Full-Scale Evaluation of Mercury Control at Great River Energy's Stanton Generating Station Using Injected Sorbents and a Spray Dryer/Baghouse," to be presented at Air Quality III Conference, Session A3b, 2002, 14 pages.

Sjostrom et al., "Full-Scale Evaluation of Mercury Control by Injecting Activated Carbon Upstream of a Spray Dryer and Fabric Filter," Presented at the 2004 combined power plant air pollutant control mega symposium, Washington, D.C., Aug. 2004, 18 pages.

Sjostrom, "Evaluation of Sorbent Injection for Mercury Control," ADA-ES, Inc. Topical Report for Basin Electric Power Cooperative's Laramie River Station, Jan. 16, 2006, 49 pages.

Sjostrom, "Evaluation of Sorbent Injection for Mercury Control," Topical Report for Sunflower Electric's Holcomb Station, U.S. DOE Cooperative Agreement No. DE-FC26-03NT41986, Topical Report No. 41986R07, Jun. 28, 2005, 85 pages.

Sliger et al., "Towards the Development of a Chemical Kinetic Model for the Homogeneous Oxidation of Mercury by Chlorine Species," Fuel Processing Technology, vol. 65-66, 2000, pp. 423-438.

Speight, ed., The Chemistry and Technology of Coal, CRC Press, 1994, pp. 152-155.

Starns et al., "Full-Scale Evaluation of TOXECON II™ on a Lignite-Fired Boiler" presented at US EPA/DOE/EPRI Combiner Power Plant Air Pollutant Control Symposium: The Mega Symposium, Washington, DC, Aug. 30-Sep. 2, 2004, 14 pages.

Sudhoff, "Anticipated Benefits of the TOXECON Retrofit for Mercury and Multi-Pollutant Control Technology," National Energy Technology Laboratory, Nov. 19, 2003, available at http://www.netl.doe.gov/technologies/coalpower/cctc/pubs/Benefits_TOXECON_111903.pdf, pp. 1-20.

Teller et al., "Mercury Removal from Incineration Flue Gas," Air and Water Technologies Co., for presentation at the 84th Annual Meeting & Exhibition Vancouver, British Columbia, Jun. 16-21, 1991, 10 pages.

The Merck Index, 12th ed., Merck Research Laboratories, 1996, pp. 271-272, 274, 1003-1005.

The Merck Index, 12th ed., Merck Research Laboratories, 1996, pp. 969-970; 1320-321.

Turner et al., Fabric Filters, Chapter 5 of OAQPS Control Cost Manual, United States EPA, Office of Air Quality Planning and Standards, Dec. 1998, pp. at 5-1 to 5-64.

Uehara et al., "Thermal Ignition of Calcium Hypochlorite," Combustion and Flame, vol. 32, 1978, pp. 85-94.

United States Environmental Protection Agency, "Study of Hazardous Air Pollutant Emissions from Electric Tility Steam Generating Units," Report to Congress, vol. 1-2, EPA-453/R-98-004a&b, Feb. 1998, pp. 1-165.

Urabe et al., "Experimental Studies on Hg Vapour Removal Using Corona Discharge for Refuse Incinerator," Chemical Abstracts, Oct. 1997, vol. 109, 37 pages (includes translation).

Urano, S., "Studies on Bleaching Powder, VII. The Decomposition of Calcium Hypochlorite by Heat in the Presence of Calcium Chloride," Journal of the Society of Chemical Industry of Japan, vol. 31, 1928, pp. 46-52 (no translation).

Verhulst et al., "Thermodynamic behaviour of metal chlorides and sulfates under the conditions of incineration furnaces," Environmental Science & Technology, 1996, vol. 30, No. 1, pp. 50-56.

Vidic et al., "Uptake of Elemental Mercury Vapors by Activated Carbons;," Journal of the Air & Waste Management Association, 1996, vol. 46, pp. 241-250.

Vidic et al., "Vapor-phase elemental mercury adsorption by activated carbon impregnated with chloride and cheltinq agents," Carbon, 2001, vol. 39, pp. 3-14.

Vosteen et al., Mercury Sorption and Mercury Oxidation by Chlorine and Bromine at SCR DeNOx Catalyst (Part A: Oxidation), 9th Annual EPA, DOE, EPRI, EEI Conference on Clean Air, Mercy Global Warming & Renewable Energy, Tucson, AZ, Jan. 24, 2005, 38 pages.

Vosteen et al, "Mercury-Related Chemistry in Waste Incineration and Power Generation Flue Gases," Sep. 2003, Air Quality IV, pp. 1-8.

Vosteen et al., "Bromine Enhanced Mercury Abatement from Combustion Flue Gases—Recent Industrial Applications and Laboratory Research," VGB PowerTech, International Journal for Electricity and Heat Generation, 2006, vol. 86, No. 3, pp. 70-75.

Vracar, Rajko Z., "The Study of Chlorination Kinetics of Copper (I) Sulfide by Calcium Chloride in Presence of Oxygen," Metallurgical and Materials Transactions B, Aug. 2000, vol. 31(4), pp. 723-731.

Wanke et al., "The influence of flame retarded plastic foams upon the formation of Br containing dibenzo-p-dioxins and dibenzofurans in a MSWI," Organohalogen Compounds, 1996, vol. 28, pp. 530-535.

Weast, Robert C., Ph.D., CRC Handbook of Chemistry and Physics, 1982-1983, CRC Press, pp. F76-F77.

Weber et al., "The Role of Copper(II) Chloride in the Formation of Organic Chlorine in Fly Ash," Chemosphere, 2001, vol. 42, pp. 479-582.

White et al., "Field Test of Carbon Injection for Mercury Control at Camden County Municipal Waste Combustor," EPA-600/R-93-181 (NTIS PB94-101540), Sep. 1993, pp. 1-11.

Working project report for period Oct. 1, 1999 to Sep. 30, 2001 from Institut fur Verhrenstechnik und Dampfkesselwessen (IVD), Universitat Stuttgart, dated Mar. 28, 2002, pp. 14-38.

Zygarlicke et al., "Flue gas interactions of mercury, chlorine, and ash during coal combustion," Proceedings of the 23rd International Technical Conference on Coal Utilization and Fuel Systems, Clearwater, Florida, Mar. 9-13, 1998, pp. 517-526 (ISBN 0-03206602302).

Official Action for U.S. Appl. No. 11/553,849, mailed Jun. 19, 2009.
Official Action for U.S. Appl. No. 11/553,849, mailed Mar. 2, 2009.
Official Action for U.S. Appl. No. 11/553,849, mailed Apr. 15, 2010.
Official Action for U.S. Appl. No. 11/553,849, mailed Dec. 21, 2010.
Background of the Invention for the above captioned application filed Aug. 4, 2011 (previously provided).

* cited by examiner

FIG. 1 - Prior Art

ADDITIVES FOR MERCURY OXIDATION IN COAL-FIRED POWER PLANTS

CROSS REFERENCE TO RELATED APPLICATION

The present application is a continuation of U.S. patent application Ser. No. 11/553,849, filed Oct. 27, 2006, which claims the benefits, under 35 U.S.C. §119(e), of U.S. Provisional Application Ser. No. 60/730,971, filed Oct. 27, 2005, having the same title, and which are incorporated herein by this reference.

FIELD

The invention relates generally to additives for coal-fired power plants and particularly to additives for mercury removal.

BACKGROUND

Mercury is a highly toxic element, and globally its discharge into the environment is coming under increasingly strict controls. This is particularly true for power plants and waste incineration facilities. Almost all coal contains small amounts of speciated and elemental mercury along with transition metals (primarily iron) and halogens (primarily chlorine with small amounts of bromine).

Mercury in coal is vaporized in the combustion zone and exits the high temperature region of the boiler entirely as $Hg^O$ while the stable forms of halogens are acid gases, namely HCl and HBr. The majority of coal chlorine and bromine form HCl and HBr, respectively, in the flue gas since the formation of elemental chlorine and bromine are limited due to other dominant flue gas species including water vapor, sulfur dioxide (SO2), nitrogen oxides (NOx) and sulfur trioxide (SO3). By way of example, the Griffin reaction holds that sulfur dioxide, at the boiler temperature range, reacts with elemental chlorine to form sulfur trioxide and HCl. Elemental mercury oxidation primarily to mercuric chloride and bromide species occurs via both homogeneous gas-phase and heterogeneous reactions that involve HCl and HBr, respectively. For low rank coals with low to medium sulfur and low chlorine and bromine contents however, homogeneous gas-phase Hg oxidation reactions are believed to be limited primarily by elemental $Cl_2$ and $Br_2$ rather than by HCl and HBr due to the slow reaction rate of HCl and HBr. Therefore, though homogeneous gas phase mercury oxidation by elemental chlorine does occur as the flue gas cools it is not the dominant reaction pathway because insufficient elemental chlorine is generally present. Rather, heterogeneous reactions controlled by HCl in the cooler regions of the flue gas path past the economizer section and especially occurring within and downstream of the air preheater and on duct surfaces are considered to be the primary reaction pathway for oxidation of elemental mercury by chlorine. At cooler flue gas temperatures elemental halogens may be formed from HCl and HBr by a Deacon process reaction. HCl and HBr react with molecular oxygen at cooler flue gas temperatures to form water and elemental chlorine and bromine, respectively. This reaction is thermodynamically favorable but proceeds only in the presence of metal catalysts that are primarily present on the surface of entrained fly ash particles or on duct surfaces.

The U.S. Geological Survey database COALQUAL gives halogen data from analyzed coal specimens. According to this data, U.S. coals have bromine contents between 0 and 160 ppm and the mean and median bromine concentration of the coals are 19 and 12 ppm, respectively, and chlorine contents between 0 and 4,300 ppm and the mean and median chlorine concentration of the coals are 569 and 260 ppm, respectively. Lignite and sub-bituminous (e.g., Powder River Basin ("PRB")) coals are significantly deficient in halogens as compared to average U.S. coals while bituminous coals are higher in halogens than the lower rank coals. For lower rank coals, $Hg°$ is the predominant vapor mercury species.

Various methods of augmenting HCl to increase oxidized mercury have been tested at full-scale. Direct addition of halide salts to the coal or injection of halide salts into the boiler has been attempted. There have also been a number of trials of coal blending of low-rank subbituminous coals with higher chlorine bituminous coals. Increased chlorine in the boiler in the form of halide salts or higher chlorine results in an increase of primarily HCl in the flue gas and very limited $Cl_2$. These tests appear to indicate that excess HCl alone does not significantly increase the $HgCl_2^{++}$ fraction unless a mechanism exists to make Cl available. Naturally occurring mechanisms that appear to be effective include catalysts in the form of activated carbon or LOI carbon.

For lower rank coals, there is thus a need for an effective mercury control methodology.

SUMMARY

These and other needs are addressed by the various embodiments and configurations of the present invention. The present invention is directed to an additive that includes an additive metal, preferably a transition metal, and optionally one or more halogens or halogenated compounds.

The presence of certain additive metals, such as alkali metals, alkaline earth metals, and transition metals, with transition metals being preferred and iron and copper being more preferred, has been found to provide more effective oxidation of elemental mercury. While not wishing to be bound by any theory, it is believed that certain metals, particularly transition metals, catalytically enhance elemental mercury oxidation by halogens. The precise catalytic mechanism, however, is unknown. Notwithstanding the foregoing, it is also possible that the additive metal is acting as a reactant rather than as a catalytic agent. Regardless of the precise mechanism, certain metals, particularly transition metals, have been observed to increase dramatically the ability of even small amounts of halogens in high sulfur coals to oxidize elemental mercury in the waste gas.

In coal combustion in particular, the additive of the present invention is believed to promote mercury oxidation and sorption by enrichment of transition metal catalysts in the fly ash or on suitable mercury sorbents that are injected and captured with the fly ash. The mechanism may involve a catalytic release of $Cl_2$ from vapor HCl via a Deacon reaction although the specific reactions and intermediates are not well characterized. Enriching the fly ash surface or a supplemental sorbent such as activated carbon with catalysts may mobilize native halogens. However, the halogen availability may still be an overall rate limiting factor. Supplemental halogens addition either with the coal feed or downstream in the mercury oxidation region may be required.

When iron is used as the metal in the additive, other significant benefits can be realized.

For example, the additive metals of the present invention can provide substantially enhanced levels of elemental mercury oxidation, due to a lower concentration in the flue gas of sulfur oxides. According to the Griffin reaction, a lower sulfur dioxide concentration means that less elemental chlorine reacts to form HCl and sulfur trioxide (which further results in a lower sulfur trioxide concentration in the flue gas). Thus, more elemental chlorine is present to oxidize mercury. This may be because certain transition metals, particularly iron, act as a scrubbing agent in the removal of sulfur from the flue gas. While not wishing to be bound by any theory, it is believed that the additive, when added to the coal feed prior to combustion, forms a transition metal oxysulfide compound. During combustion, the small transition metal oxide particles are believed to fill the combustion atmosphere and act as a scrubbing medium. The efficacy of the transition metal oxide particles in sulfur removal is believed to be enhanced in wet bottom or slag tap type furnaces. In such furnaces, the particles melt and are incorporated into the molten slag layer on the furnace walls along with the other slag-forming ingredients present in the ash content of the coal being combusted. When oxysulfide particles become lodged in the slag layer, they are diluted with silica and other oxides present in the slag, thereby lowering activity of the oxysulfide and improving its sulfur-fixing capability. In the case of iron, the effective liquid iron oxysulfide may have the composition range:

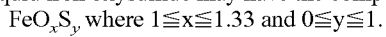
$FeO_xS_y$ where $1 \leq x \leq 1.33$ and $0 \leq y \leq 1$.

The sulfur removal ability of the transition metal may be a substantial contributor to the ability of halogens to oxidize elemental mercury.

By way of further example, the ability of wet bottom boilers, such as cyclone boilers, to burn low sulfur western coals has been found to be enhanced substantially by iron addition. While not wishing to be bound by any theory, iron, in the calcium aluminosilicate slags of western coals, is believed to act as a fluxing agent and cause a decrease in the melting temperature of the ash and crystal formation in the melt when a critical temperature ($T_{CV}$) is reached. These crystals change the flow characteristics of the slag causing the slag to thicken before the slag can flow. This phenomenon is known as "yield stress" and is familiar to those skilled in the art of non-Newtonian flow. Thicker slag allows the slag to capture and hold more coal particles. Therefore, fewer coal particles escape the combustor without being burned.

In a preferred embodiment, the additive is in the form of a free-flowing particulate having a $P_{90}$ size of no more than about 300 microns (0.01 inch) and includes at least about 50 wt. % iron, commonly no more than about 5 wt. % (dry basis) carbon and even more commonly no more than about 1 wt. % carbon, no more than about 0.1 wt. % sulfur, and at least about 0.5 wt. % halogens.

Preferably, the additive further includes a mineralizer, such as zinc oxide. While not wishing to be bound by any theory, it is believed that the zinc increases the rate at which iron fluxes with the coal ash. Zinc is believed to act as a mineralizer. Mineralizers are substances that reduce the temperature at which a material sinters by forming solid solutions. This is especially important where, as here, the coal/ash residence time in the combustor is extremely short (typically less than about one second). Preferably, the additive includes at least about 1 wt. % (dry basis) mineralizer and more preferably, the additive includes from about 3 to about 5 wt. % (dry basis) mineralizer. Mineralizers other than zinc oxides include calcium, magnesium or manganese flourides or sulfites and other compounds known to those in the art of cement-making. Preferably, the additive includes no more than about 0.5 wt. % (dry basis) sulfur, more preferably includes no more than about 0.1 wt. % (dry basis) sulfur, and even more preferably is at least substantially free of sulfur.

The present invention can provide further advantages depending on the particular configuration. By way of example, the additive(s), as noted, can provide a slag layer in the furnace having the desired viscosity and thickness at a lower operation temperature. As a result, there is more bottom ash to sell, more effective combustion of the coal, more reliable slag tapping, improved boiler heat transfer, and a relatively low amount of entrained particulates in the offgas from combustion, leading to little or no degradation in performance of particulate collectors (due to the increased particulate load). The boiler can operate at lower power loads (e.g., 60 MW without the additive and only 35 MW with the additive as set forth below) without freezing the slag tap and risking boiler shutdown. The operation of the boiler at a lower load (and more efficient units can operate at higher load) when the price of electricity is below the marginal cost of generating electricity, can save on fuel costs. The additive can reduce the occurrence of flames in the main furnace, lower furnace exit temperatures (or steam temperatures), and decrease the incidence of convective pass fouling compared to existing systems. The additive can have little, if any, sulfur, thereby not adversely impacting sulfur dioxide emissions. These and other advantages will become evident from the following discussion.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "ash" refers to the residue remaining after complete combustion of the coal particles. Ash typically includes mineral matter (silica, alumina, iron oxide, etc.). As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "high alkali coals" refer to coals having a total alkali (e.g., calcium) content of at least about 20 wt. % (dry basis of the ash), typically as CaO, while "low alkali coals" refer to coals having a total alkali content of less than 20 wt. % and more typically less than about 15 wt. % alkali (dry basis of the ash), typically as CaO.

As used herein, "coal" refers to macromolecular network comprised of groups of polynuclear aromatic rings, to which are attached subordinate rings connected by oxygen, sulfur and aliphatic bridges. Coal comes in various grades including peat, lignite, sub-bituminous coal and bituminous coal.

As used herein, "halogen" refers to an electronegative element of group VIIA of the periodic table (e.g., flourine, chlorine, bromine, iodine, astatine, listed in order of their activity with flourine being the most active of all chemical elements).

As used herein, "halide" refers to a binary compound of the halogens.

As used herein, "high sulfur coals" refer to coals having a total sulfur content of at least about 1.5 wt. % (dry basis of the coal) while "low sulfur coals" refer to coals having a total sulfur content of less than about 1.5 wt. % (dry basis of the coal).

As used herein, "high iron coals" refer to coals having a total iron content of at least about 10 wt. % (dry basis of the ash), typically as $Fe_2O_3$, while "low iron coals" refer to coals having a total iron content of less than about 10 wt. % (dry basis of the ash), typically as $Fe_2O_3$. As will be appreciated, iron and sulfur are typically present in coal in the form of ferrous or ferric carbonites and/or sulfides, such as iron pyrite.

As used herein, "transition metal" or "transition element" refers to any of a number of elements in which the filling of the outermost shell to eight electrons within a period is interrupted to bring the penultimate shell from 8 to 18 or 32 electrons. Only these elements can use penultimate shell orbitals as well as outermost shell orbitals in bonding. All other elements, called "major group" elements, can use only outermost-shell orbitals in bonding. Transition elements include elements 21 through 29 (scandium through copper), 39 through 47 (yttrium through silver), 57 through 79 (lanthanum through gold), and all known elements from 89 (actinium) on. All are metals.

DETAILED DESCRIPTION

The Additive

Figure 1:
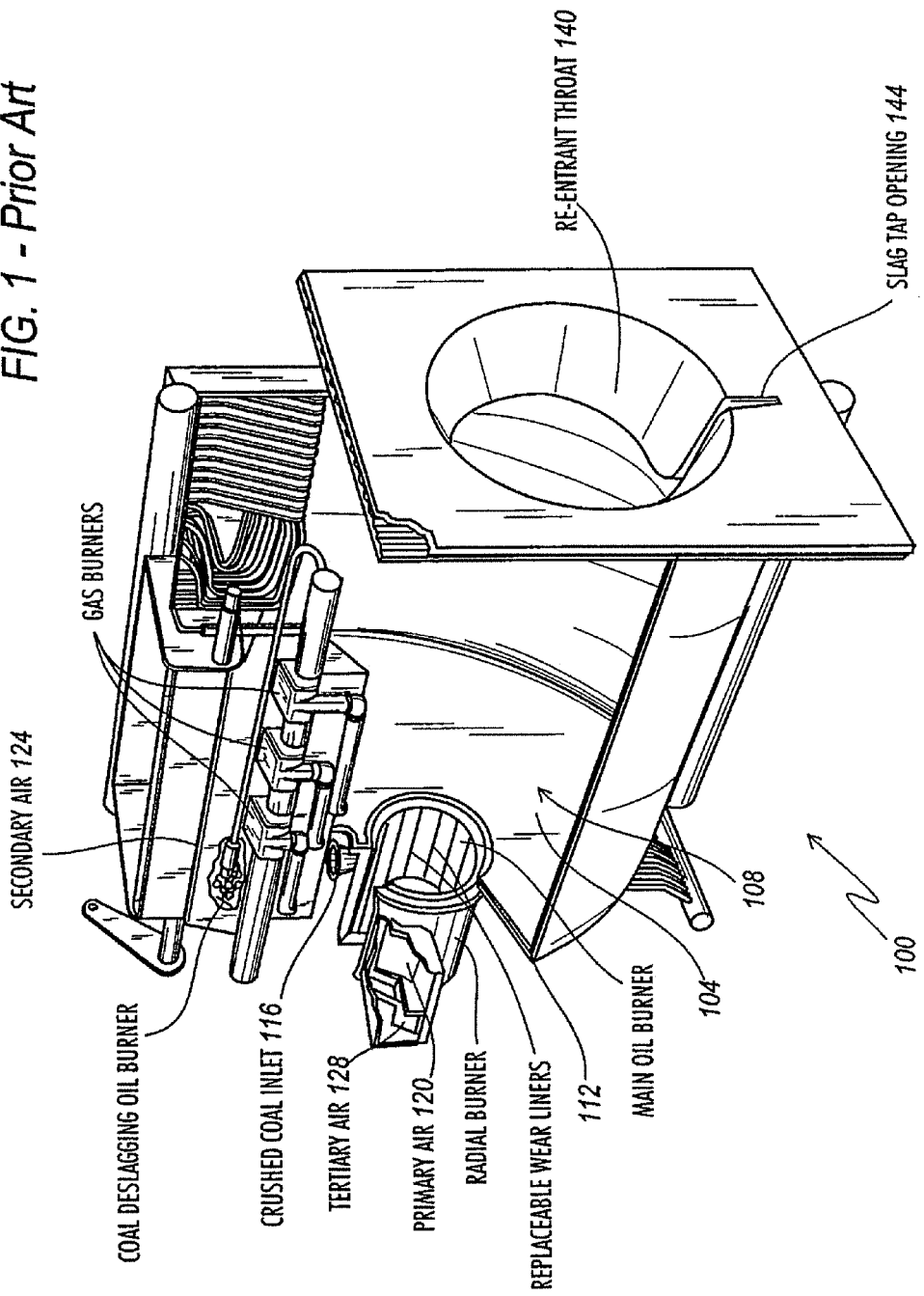
FIG. 1 is a prior art depiction of a cyclone boiler.
Figure 2:
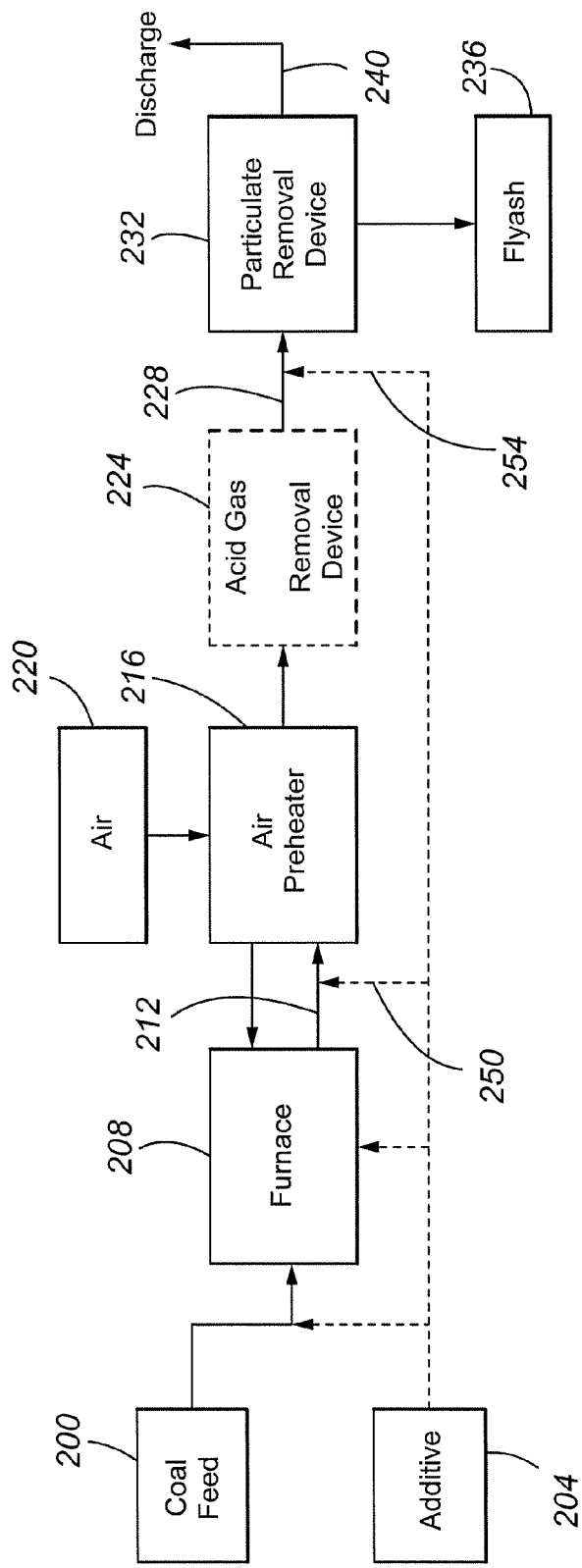
FIG. 2 is a block diagram of a coal combustion waste gas treatment assembly according to an embodiment of the present invention.

The additive of the present invention is believed to promote elemental mercury oxidation by means of metal mercury oxidation catalysts. The catalysis mechanism may involve formation of elemental chlorine or bromine via the Deacon process reaction or a similar reaction occurring at the fly ash surface in the presence of vapor HCl and/or HBr. The direct addition of reactive metal compounds where there is sufficient vapor HCl and/or HBr can achieve high levels of mercury oxidation and mercury capture. If needed, halogens and halide compounds can be added, as part of or separate from the additive, to promote mercury oxidation in proximity to surface sites of collected fly ash in particulate control devices where natively occurring flue gas halide or halogen concentration(s) alone are insufficient to promote such oxidation.

While the additive metal is described as likely acting as a catalyst, rather than a reactant, in the oxidation of mercury, it is to be understood that the metal may be performing a non-catalytic function. Evidence can also support the metal undergoing a heterogeneous reaction or a gas/gas and gas/solid reaction with the elemental mercury. The additive metal may also be tying up sulfur, preventing the formation of free sulfur oxides that can, according to the Griffin reaction, inhibit halogens from oxidizing elemental mercury. The phrase "additive metal" is therefore not to be limited to a catalytic function but may also or alternatively be read to include one or more other types of reactions.

In a first formulation, the additive includes one or more additive metals, in either elemental or speciated form, or a precursor thereof, to catalyze oxidation of elemental mercury by natively occurring halogens and/or interhalogen compounds. The additive metals are preferably one or more transition metals, with iron, vanadium, manganese, and copper being preferred, iron and copper being more preferred, and iron being particularly preferred. Particularly preferred forms of iron and copper are oxides, transition metal halide salts (e.g., inter transition/halogen compounds), transition metal sulfides, transition metal sulfates, and transition metal nitrates, in which the transition metal has a higher oxidation state, with a "higher" oxidation state being at least a charge of +2 and more preferably at least a charge of +3 with the highest desirable oxidation state being +4. Exemplary transition metal catalysts include metal oxides (e.g., $V_2O_3$, $V_2O_4$, $V_2O_5$ FeO, $Fe_2O_3$, $Fe_3O_4$, copper (I) oxide ($Cu_2O$), and copper (II) oxide (CuO)), metal halides (e.g., iron (III) chloride, iron (II) chloride ($FeCl_2$), iron (II) bromide, iron (III) bromide, and copper (II) chloride), metal nitrates (e.g., copper nitrates including copper (II) nitrate (Cu $(NO_3)_2$, and iron (III) nitrate (Fe $(NO_3)_3$)), metal sulfates (e.g., iron (III) sulfate ($Fe_2(SO4)_3$), iron (II) sulfate ($FeSO_4$), manganese dioxide ($MnO_2$), and higher forms and hydrated states of the foregoing transition metals. The additive may have the additive metal in a lower oxidation state provided that, after introduction into the combustion zone or flue gas, the additive metal is oxidized to a higher oxidation state.

In one configuration, the additive is manufactured by any one of a number of processes. For example, the additive can be iron-enriched recycle products from steel mills, such as the particles removed by particulate collection systems (e.g., by electrostatic precipitators or baghouses) from offgases of steel or iron manufacturing, oily mill scale fines, enriched iron ore materials, such as taconite pellets or magnetite, red mud from the bauxite mining industry, recycled fly ashes or other combustion byproducts enriched in additive metals such as high-iron fly ashes, cement kiln dusts or combustion ashes from oil-fired boilers that have high concentrations of vanadium, and finely divided powders made from these materials by milling or grinding. Preferably, the additive is the collected fines (flue dust and/or electrostatic precipitator dust) from the offgas(es) of a blast furnace, Basic Oxygen Furnace (BOF), or electric arc furnace, dust such as used in the iron or steel making industry. In such materials, the iron and mineralizer are typically present as oxides.

The additive metal in these additives are predominantly iron oxides. Preferably, the additive includes at least about 50 wt. % (dry basis) iron and more preferably at least about 80 wt. % (dry basis) iron and even more preferably from about 70 to about 90 wt. % (dry basis) iron. Preferably, the ratio of ferric (or higher valence) iron to ferrous (or lower valence) iron is less than 2:1 and even more preferably ranges from about 0.1:1 to about 1.9:1, or more preferably at least about 33.5% and even more preferably at least about 35% and even more preferably at least about 40% of the iron in the additive is in the form of ferrous (or lower valence) iron and no more than about 65% of the iron in the additive is in the form of ferric (or higher valence) iron. In a particularly preferred formulation, at least about 10%, more preferably at least about 15% of the iron is in the form of wustite, and even more preferably from about 15 to about 50% of the iron is in the form of wustite.

The additive in this configuration can include other beneficial materials.

One beneficial material is a mineralizing agent, such as zinc. While not wishing to be bound by any theory, it is believed that the zinc increases the rate at which iron fluxes with the coal ash in slag-type furnaces. "Ash" refers to the residue remaining after complete combustion of the coal particles and typically includes mineral matter (silica, alumina, iron oxide, etc.). Mineralizers are substances that reduce the temperature at which a material sinters by forming solid solutions. This is especially important because the coal/ash residence time in the combustor is typically extremely short (typically less than about one second). Preferably, the additive includes at least about 1 wt. % (dry basis) mineralizer and more preferably, the additive includes from about 3 to about 15 wt. % (dry basis) mineralizer, even more preferably from about 2 to about 8 wt. % (dry basis), and even more preferably from about 3 to about 5 wt. % (dry basis) mineralizing agent. Mineralizers other than zinc oxides include calcium, magnesium or manganese flourides or sulfites and other compounds known to those in the art of cement-making Due to the formation of sulfur oxides, the additive preferably includes no more than about 0.5 wt. % (dry basis) sulfur, more preferably includes no more than about 0.1 wt. % (dry basis) sulfur, and even more preferably is at least substantially free of sulfur.

Other beneficial materials include oils and greases produced during metal finishing operations. Oils and greases have the advantages of preventing fugitive emissions during handling and shipping and replacing the heat input requirement from the coal in the boiler and thus reduce fuel costs for producing electricity. Typically, such additives will contain from about 0.1 to about 10 wt. % (dry basis) greases and oils.

In coal-fired flue gases from low rank subbituminous coals, oxidation of vapor phase elemental mercury to the primary ionic species mercury chloride ($HgCl_2^{++}$) and bromine chloride ($HgBr_2^{++}$) is believed to depend primarily upon the presence of sufficient hydrogen chloride (HCl) and other halogens in the flue gas. While not wishing to be bound by any theory, mercury oxidation reaction mechanisms are postulated to be various homogeneous gas phase reactions and complex multi-step heterogeneous reactions involving gas/solid surface exchange reactions. Oxidation is limited by available halogens in the flue gas for the case of subituminous coal combustion. It is believed that the oxidation and chemisorption of the mercury onto activated carbon sorbents or onto native unburned carbon in the fly ash involves multi-step heterogeneous chemical reactions at surface sites. These reactions may be catalyzed by certain metals and metal oxides present on the carbon. The additive of the present invention enhances unburned carbon sorption of mercury by enrichment of the fly ash with additive metals in combination with sufficient oxidizing agents at the carbon surface.

If elemental chlorine and bromine were to become available at the downstream fly ash surfaces, for example via catalyzed reaction of HCl with active metal surface sites on carbon enriched fly ash, then it can readily recombine with elemental mercury to form mercury chloride species, primarily $HgCl_2^{++}$. By way of example, vanadium pentoxide $V_2O_5$, CuO, and $Fe_2O_3$ are examples of transition metal mercury oxidation catalysts typically present in fly ash. The temperature at the fly ash surface governs the reaction rate. In the relatively cool zone of particulate control devices, $Hg^0$ reacts rapidly with any available elemental chlorine to form $HgCl_2^{++}$. This oxidized mercury can then bind to surface sites within the fly ash or to activated carbon or LOI carbon within the fly ash layer.

In a second formulation, the additive includes one or more additive metal catalysts or a precursor thereof and one or more elemental halogens (e.g., $Cl_2$ and $Br_2$), interhalogen compounds (e.g., BrCl), and halide salts to act as elemental mercury oxidants. Preferred supplemental halide salts are calcium chloride ($CaCl_2$), iron (III) chloride ($FeCl_3$), copper (II) chloride ($CuCl_2$), magnesium bromide ($MgBr_2$), calcium bromide, sodium bromide, potassium iodide, and also the hydrated states of these halide salts. The halogens may also be introduced in other organically and inorganically bound forms. Interhalogen compounds, such as BrCl, are believed to behave as elemental halogens with respect to elemental mercury oxidation. They are also believed to survive combustion and to be substantially nonreactive with sulfur oxides. The second formulation is used where the coal has a low halogen content, as is the case for lower rank coals, such as lignite and sub-bituminous coals. Such coals are typically deficient in bromine and chlorine relative to the mercury content of the coal.

In a third formulation, the additive is in the form of a carrier substrate carrying the metal additive metal and/or halogen. The carrier substrate is preferably a high surface area sorbent with suitable surface functional groups for mercury sorption. In a particularly preferred formulation, the mercury oxidation catalyst is directly deposited onto a mercury sorbent. Preferred carrier substrates include activated carbon, ash, and zeolites. The activated carbon can be manufactured from any source, such as wood charcoal, coal, coke, coconut shells, resins, and the like. The additive metal and/or halogen are deposited on the carrier substrate by known techniques, such as by chemical precipitation, ionic substitution, or vapor deposition techniques. By way of example, impregnation method can be by liquid contact (rinse) of the sorbent with aqueous solution of any of the soluble mercury oxidation catalysts or, more preferably, by mechanical dry grinding of the sorbent with any of the powdered or granular mercury oxidation catalysts. In a particularly preferred formulation, the mercury sorbent is activated carbon and the mercury oxidation catalyst for sorbent contact is Copper (II) chloride. Oxidation and capture of the oxidized mercury are then accomplished at the surface of the injected sorbent, generally powdered activated carbon. The catalyst-impregnated sorbent is preferably injected as a dry powder into the flue gas upstream of the particulate control device. The sorbent is co-precipitated with fly ash in an ESP or co-deposited onto the ash filter cake in a baghouse.

In a fourth formulation, the additive is in the form of a combustible carbonaceous substrate, preferably coal or fly ash, on which the additive metal and/or halide is deposited. The deposition is by any suitable technique, including those referenced in connection with the third formulation. Unlike the third formulation, the additive metal and halide is intimately bound with the combustible carbon. As a result, the additive metal and halide will be released into the flue gas when the substrate is combusted. This will lead to a high degree of dispersion of the metal and halide in the flue gas. This will, in turn, potentially provide a higher degree of and more rapid oxidation of mercury.

In any of the above formulation, the amounts of the additive metal and halogen in the additive depend on the natively occurring amounts of mercury, additive metal, and halogen in the coal. Preferably, the additive of the first formulation contains from about 10 to about 100 wt. % additive metal, more preferably from about 25 to about 100 wt. % additive metal, and even more preferably from about 50 to about 100 wt. % additive metal. The additive is preferably free or substantially free of halogens. In the second formulation, the additive contains preferably from about 10 to about 90 wt. % additive metal, more preferably from about 25 to about 90 wt. % additive metal, and even more preferably from about 50 to about 90 wt. % additive metal and from about 0.1 to about 50 wt. % halogen, more preferably from about 0.5 to about 10 wt. % halogen, and even more preferably from about 0.5 to about 5.0 wt. % halogen. The third and fourth formulations preferably include from about 1 to about 99 wt. % substrate; from about 0.1 to about 50 wt. % additive metal, more preferably from about 0.1 to about 35 wt. % additive metal, and even more preferably from about 0.1 to about 20 wt. % additive metal; and from about 0 to about 30 wt. % halogen, more preferably from about 0 to about 20 wt. % halogen, and even more preferably from about 0 to about 10 wt. % halogen.

Regardless of the formulation, the temperature at the fly ash and/or carrier substrate surface governs the reaction rate. In the relatively cool zone of particulate control devices, $Hg^0$ reacts rapidly with any available elemental chlorine and bromine to form $HgCl_2^{++}$ and $HgBr_2^{++}$. This oxidized mercury can then bind to surface sites (or LOI carbon) within the entrained, uncollected fly ash, LOI carbon within the collected fly ash layer, or to the mercury sorbent.

The rate of introduction of the additive to the furnace and/or flue gas depends on the combustion conditions and the chemical compositions of the coal feed and additive. Typically, the additives of the first and second formulations are introduced in the form of a dry powder or liquid and in an amount ranging from about 10 to about 50 lb/ton coal and more typically from about 10 to about 20 lb/ton coal. Stated another way, the additive of the first and second formulations are preferably introduced at a concentration of from about 0.3 to about 100 lbs additive/Mmacf in the flue gas or in an amount ranging from about 0.1 to about 3.0% by weight of the coal feed 200, with from about 0.5 to about 1.5% being preferred. The additive metal-impregnated sorbent of the third formulation is preferably introduced as a dry powder into the flue gas upstream of the particulate control device at a concentration of from about 0.1 to about 10.0 lbs sorbent/Mmacf in the flue gas.

The additive is preferably in the form of a free-flowing particulate having a relatively fine particle size. Preferably, the $P_{90}$ size of the additive is no more than about 300 microns, more preferably no more than about 150 microns, and even more preferably no more than about 75 microns.

The Use of the Additive

The use of the additive will now be described with reference to FIG. 1.

The coal feed 200 is predominantly coal, with lower rank coals being preferred. Although any rank coal or composition of coal can be treated effectively by the additive 204 of the present invention, the coal feed 200 has a preferred composition for optimum results. The coal feed 200 preferably has an alkali component that ranges from about 12 to about 25 wt. % (dry basis) of the ash, a sulfur composition ranging from about 0.1 to about 1.5 wt. % (dry basis) of the ash, a phosphorus content ranging from about 0.1 to about 1.5 wt. % (dry basis) of the ash, an iron content ranging from about 2 to about 7 wt. % (dry basis) of the ash, a silica content ranging from about 9 to about 16 wt. % (dry basis) of the ash, and an alumina content ranging from about 13 to about 20 wt. % (dry basis) of the ash. Because oxidized mercury is sorbed onto the fly ash, it is preferred that the fly ash 236 has a Loss On Ignition content of at least about 10 wt. % (dry basis) and more preferably ranging from about 15 to about 50 wt. % (dry basis).

The coal feed 200, particularly when it is a low iron and high alkali coal, such as a PRB coal, can have low halogen content. Typically, such coals comprise no more than about 500 ppm (dry basis of the coal) halogens, more typically no more than about 250 ppm (dry basis of the coal) halogens, and even more typically no more than about 100 ppm (dry basis of the coal) halogens. The halogens are predominantly chlorine with some bromine. The atomic ratio of chlorine to bromine in such coals typically ranges from about 1:1 to about 250:1. Stated another way, such coals typically comprise no more than about 500 ppm (dry basis of the coal) chlorine, more typically no more than about 250 ppm (dry basis of the coal) chlorine, and even more typically no more than about 100 ppm (dry basis of the coal) chlorine and typically comprise no more than about 25 ppm (dry basis of the coal) bromine, and more typically no more than about 15 ppm (dry basis of the coal) bromine, and even more typically no more than about 10 ppm (dry basis of the coal) bromine. The coal feed 200 is preferably in the form of a free flowing particulate having a $P_{90}$ size of no more than about 0.25 inch.

The coal feed 200 is introduced into and combusted in the furnace 208. A properly designed furnace burns the coal feed completely and cools the combustion products sufficiently so that the convection passes of the boiler unit is maintained in a satisfactory condition of cleanliness. Coal-fired furnaces have many different configurations and typically include a plurality of combustors. Preferably, the furnace is a dry-ash, fuel-bed, chain-grate, spreader stoker, or slag-tap unit. In a "slag type" or "Slag tap" furnace configuration, a slag layer forms on a surface of the burner and captures the coal particles for combustion. In a typical furnace, the combustion temperature of the coal, and flue gas temperature, ranges from about 1425 to about 1650° C. (2600 to 3000° F.). An example of a combustor 100 for a slag-type furnace is depicted in FIG. 1. The depicted combustor design is used in a cyclone furnace of the type manufactured by Babcock and Wilcox. Cyclone furnaces operate by maintaining a sticky or viscous layer of liquid (melted) ash (or slag) (not shown) on the inside cylindrical walls 104 of the cyclone combustion chamber 108. Coal is finely crushed or pulverized (e.g., to minus ¼ inch top size), entrained in an airstream, and blown into the combustor end 112 of the cyclone combustor or combustor 100 through coal inlet 116. Combustion air (shown as primary air 120, secondary air 124, and tertiary air 128) is injected into the combustion chamber 108 to aid in combustion of the coal. The whirling motion of the combustion air (hence the name "cyclone") in the chamber 108 propels the coal forward toward the furnace walls 104 where the coal is trapped and burns in a layer of slag (not shown) coating the walls. The re-entrant throat 140 (which restricts escape of the slag from the chamber 108 via slag tap opening 144) ensures that the coal particles have a sufficient residence time in the chamber 108 for complete combustion. The slag and other combustion products exit the chamber 108 through the slag tap opening 144 at the opposite end from where the coal was introduced. The molten slag (not shown) removed from the chamber 108 flows to a hole (not shown) in the bottom of the boiler where the slag is water-quenched and recovered as a saleable byproduct.

The ash composition is important to prevent the slag from freezing in the hole and causing pluggage. To melt ash into slag at normal combustion temperatures (e.g., from about 2600 to about 3000° F.), slag-type furnaces, such as cyclones, are designed to burn coals whose ash contains high amounts of iron and low amounts of alkali and alkaline earth metals. When burning low iron and sulfur and high alkali coals, such as PRB coals, the additive includes iron as the additive metal. Iron both reduces the melting temperature of the ash and increases the slag viscosity at these temperatures due to the presence of iron aluminosilicate crystals in the melt.

The flue gas 212 from the furnace 208 passes through an economizer section (not shown) and through an air preheater 216. The air preheater 216 is a heat exchange device in which air 220 for the furnace 208 is preheated by the flue gas 212. Immediately upstream of the air preheater 216, the flue gas 212 has a temperature ranging from about 480 to about 880° F. while immediately downstream of the air preheater 216 the flue gas 212 has a temperature ranging from about 260 to about 375° F.

After passing through the air preheater 216, the flue gas is treated by an acid gas removal device 224. An example of an acid gas removal device 224 is a flue gas desulfurizer. The device 224 typically removes most and more typically substantially all of the sulfur oxides in the flue gas.

The acid gas treated flue gas 228 is next passed through a particulate removal device 232, such as a fabric filter baghouse or cold-side electrostatic precipitator, to remove preferably most and more preferably substantially all of the particles, particularly fly ash 236 and sorbent (if any), in the flue gas. Most of the oxidized mercury and excess halogens are absorbed by the fly ash and/or mercury sorbent of the third formulation and is therefore removed by the device 232.

In one plant configuration, the acid gas removal device 224 is positioned downstream of the particulate removal device 232.

The treated flue gas 240 is then discharged through a stack (not shown) into the atmosphere.

The treated flue gas 240 complies with applicable environmental regulations. Preferably, the treated flue gas 240 includes no more than about 0.0002 ppmv mercury (of all forms) (i.e., <2 µ/nm$^3$).

The additive 204 can be introduced into the combustion system in a number of locations. The additive 204 can be combined and introduced with the coal feed 200, injected into the furnace atmosphere independently of the coal feed 200, injected into the flue gas 212 upstream of the air preheater 216, or injected into the acid gas treated flue gas 228 upstream of the particulate removal device 232.

Selection of mercury oxidation catalyst and the method of delivery depends not only on the configuration but also on the location of additive introduction.

For plants that have inherently high unburned (or Loss on Ignition ("LOI")) carbon in the fly ash as a result of combustion optimization for $NO_x$ control, including both Pulverized Coal ("PC") boilers and cyclone boilers, mercury control can be readily achieved by utilization of the fly ash without use of the third formulation. In one application, a high unburned (or wherein the coal has an LOI of at least about 10%. Unburned Loss-On-Ignition ("LOI") carbon in the ash has a low Brunauer-Emmet-Teller ("BET") surface area compared to activated carbon. However, the quantity available and the exposed large pore surface sites make it a good sorbent for in-flight mercury capture if the mercury can be absorbed onto the ash. The additive can improve mercury sorption of unburned carbon for these plants by 1) enriching the ash with mercury oxidation catalysts, 2) effecting better utilization of available HCl and HBr and 3) providing supplemental oxidizing agents (halogens), when needed to promote heterogeneous mercury oxidation and chemisorption on the unburned carbon. Enrichment of the unburned carbon and fly ash is effected by addition of the additive either into the coal feed 200 or by injection into the boiler 208. A portion of the metals are incorporated into the fly ash as various forms of oxides.

For plants with minimal unburned carbon (i.e., an LOI carbon content of no more than about 5 wt. %), mercury oxidation can be promoted by injection of the additive into the flue gas downstream of the furnace 208. The additive of the first or second formulation is distributed with alkaline fly ash or fly ash with high-calcium spray dryer solids or the additive of the third formulation is used without supplemental fly ash addition. Selection of oxidation catalysts for downstream injection is not limited to oxide forms.

For non-scrubbing plants firing subbituminous Powder River Basin coals, or for a blend of sub-bituminous and bituminous coals, addition of the additive to the coal feed 200 or direct injection of the additive 200, as a powdered solid or liquid atomized solution containing the additive into the boiler via overfire air (OFA) ports, are preferred options. In the former option, the additive is pre-mixed into the as-received coal, added and mixed on the coal pile, vapor deposited on the coal (discussed below), or added in the coal handling system, preferably prior to crushers and/or pulverizers. Transition metals intimately mixed with the coal will form transition metal oxides in the combustion zone and ultimately a fraction of these will report to the fly ash 236.

When the additive is injected into the furnace, the injection point and method will depend upon the boiler configuration. Overfire air ports (OFA) are a preferred location, where available. The additive can be either blown in as a finely divided powder or injected as a finely atomized liquid solution through OFA ports.

For either additive introduction with the coal feed or injection into the boiler 208, the resulting halide or halogen concentration in the flue gas after injection of the mercury oxidation catalyst is preferably less than about 120 ppm. Higher HCl concentrations are undesirable due to concerns with excessive corrosion of internal boiler tube and downstream duct structures. Additive composition can be tailored to the particular fuel fired and may include a combination of a supplemental halide salt and a transition metal containing material in different mix proportions. If sufficient HCl and HBr are available in the coal then a preferred additive for fuel or boiler addition is the first formulation.

When sufficient halogens are not present, limited amounts of halide salts may be added with the additive as set forth above in the second formulation. The halide salts may be pre-mixed into the bulk additive to provide freeze conditioning or dust control or to improve handling characteristics of the material. The supplemental halide salts will decompose at combustion forming free halogens (elemental chlorine or bromine) that then primarily form HCl or HBr or HI in the cooling flue gases.

The additive of the second formulation is particularly useful for effective mercury removal for coals having relatively low concentrations of native vapor HCl and HBr and/or where minimal levels of additional halides are required to convert the primarily elemental mercury (Hgo) to oxidized mercury species, e.g., HgCl2++. In the second formulation, it is desirable to maintain the concentration of HCl to a level less than that creating undesirable fouling or corrosion. This level is preferably no more than about 200 ppm total HCl in the flue gas. While not wishing to be bound by any theory, it is believed that catalyzed mercury oxidation takes place primarily in intimate contact with the ash surface in the particulate collection device 232. Chemisorption of the oxidized mercury onto a suitable particulate substrate selected from a calcium-enriched fly ash, residual unburned carbon (LOI carbon) in fly ash, or supplemental sorbents, such as powdered activated carbon, is accomplished in the fly ash baghouse filter cake or the electrostatic precipitator collected ash layer.

One disadvantage to the direct addition of bromine and iodine compounds is the potential for atmospheric emission of bromine or iodine or hazardous organic halogenated compounds. If discharged to the atmosphere, the amount of bromine or iodine liberated and available for upper level atmospheric ozone destruction is equivalent to firing a higher halogen coal. Nevertheless, the net benefit of mercury control is diminished if a low level but high volume continuous bromine emission were to be allowed. This present invention can reduce the potential for bromine slip in two ways:

I. For the case of upstream addition of halogenated compounds in combination with transition metal catalysts, excess of unburned carbon and formation of catalyst-enriched carbon ash essentially sorb and bind all of the halogen oxidizing agents to the ash.

II. For the case of downstream addition of activated carbon impregnated with transition metal halide salts, the halide is bound to the carbon and there will be no significant evolution of free molecular or atomic halogen species even though the relative quantity of carbon is less than for the case of unburned carbon enhancement.

Yet another additive introduction location is injection into the flue gas upstream of the particulate control device 232. The precise location of the injection point will depend upon the plant duct configuration and Air Pollution Control ("APC") type. Location 250 represents addition of the additive past the economizer section and upstream of the unit air preheater 216. In this region, duct temperatures are in a range of from about 460 to about 250° C. (880 to 480° F.). In the region upstream of location 250 and downstream of the furnace 208, the flue gas or duct temperature ranges from about 470 to about 250° C. (880 to 480° F.). Conversion of elemental chlorine and elemental bromine to vapor HCl and HBr, respectively, are substantially complete in the zone downstream of the economizer section. However, studies have shown that conversion of Hg° to mercuric chloride and other oxidized mercury species proceeds within this zone but is not completed in this temperature range. The additive can be injected at location 250 as either a finely atomized liquid solution or blown into the duct as a finely divided powder. Configuration and spacing of the duct and the air preheater 216 is a factor at this location however. Tight spacing of flow channels (baskets) in the air preheater 216 may preclude injection at this point due to the potential for pressure drop increase from deposition-induced pluggage.

It is generally preferable to introduce the additive downstream of the air preheater 216, and as close as possible to the particulate control device 232, to avoid air preheater 216 pluggage and duct deposition. Location 254 represents addition of the mercury oxidation catalyst downstream of the air preheater 216 into the ductwork leading into the particulate control device (cold-side electrostatic precipitator or baghouse). This is the most preferred location since injection at this point presents the least risk of undesirable side effects. Duct temperature at this location range from about 190 to about 125° C. (375 to 260° F.). The additive can either be blown in as a finely divided powder or introduced as a finely atomized liquid spray that flash evaporates to yield an entrained spray solid that co-deposits with fly ash.

When an acid gas removal device 224, such as a flue gas desulfurization spray dryer absorber ("FGD SDA"), is present, location 254 is upstream of the particulate removal device 232 but downstream of the acid gas removal device 224. The temperature at this location is typically in a range of about 150 to about 100° C. (300 to 210° F.). This location 255 is a preferred injection point for the additive for this plant configuration. When introduced at this location, the additive preferably contains transition metal halide salts or metal nitrates as the additive metal.

When an acid gas removal device is located downstream of the particulate removal device 232, location 254 is upstream of the baghouse. The temperature at this location is typically in a range of about 150 to about 100° C. (300 to 210° F.). Location 254 is a preferred injection point for the mercury oxidation catalysts for this plant configuration. The transition metal halide salts or metal nitrates are particularly preferred for this location.

For location 254, the additive may be injected as finely atomized liquid solution or blown in as a finely divided powder according to the physical characteristics of the particular material and the duct configuration. For hygroscopic solids such as some halogen salts that are difficult to inject as a dry powder, liquid atomization is the preferred injection method. Liquid atomization requires a downstream section of duct free from obstructions in order to allow full evaporation of spray droplets. The present invention may use any suitable liquid flue gas conditioning injection systems or dry sorbent injection systems, such as those for activated carbon injection into coal-fired flue ducts, as well as any suitable system and method of material handling and conveyance.

The additive of the third formulation may be injected, according to the method and the plant configuration, at either of locations 250 and 254 for plants with no FGD scrubbing or at location 254 for plants with SDA followed by particulate control device (FF or cold-side ESP). The use of a transition metal halide salt impregnated onto an activated carbon sorbent is particularly preferred in the third formulation when flue gas HCl/HBr concentration is low or zero such as downstream of an SDA.

Another methodology for contacting the additive of the second formulation with the coal feed 200 will now be discussed with reference to FIG. 3. In the methodology, a bleed stream of flue gas, or other preheated gas, is used to carry one or more components of the additive into contact with the coal feed 200. The use of the flue gas can not only provide a more uniform distribution of selected additive component(s) on the coal feed 200 but also preheats the additive and coal feed 200 upstream of the furnace 208.

Figure 3:
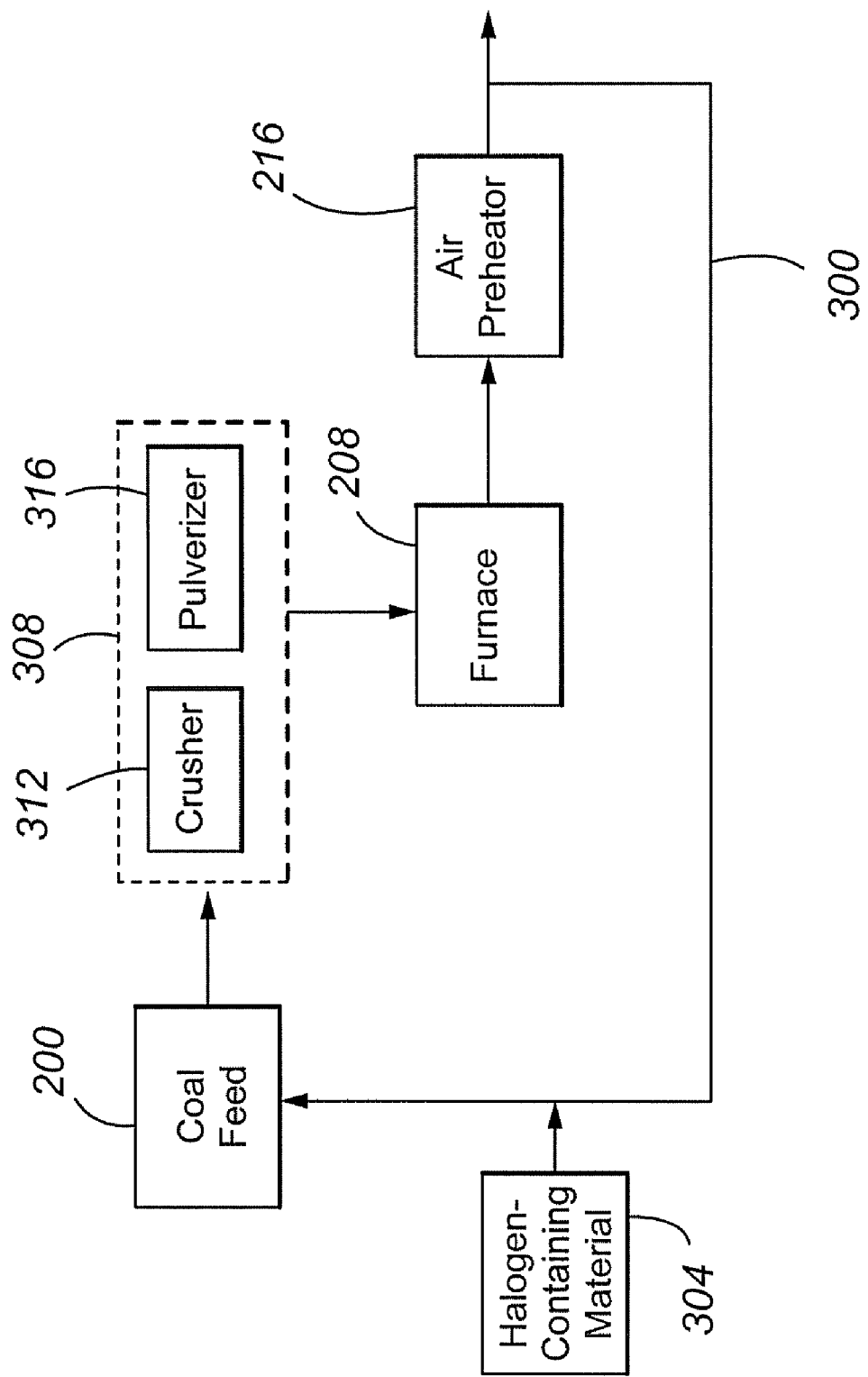
FIG. 3 is a block diagram of a coal feed treatment circuit according to an embodiment of the present invention.

Referring to FIG. 3, a portion of the flue gas, from a point downstream of the air preheater 216, is removed from the main duct and redirected into contact with the coal feed 200. The point of removal from the main duct is selected such that the temperature of the flue gas 300 is less than the autoignition temperature of the coal feed 200. Preferably, the flue gas 300 temperature is no more than about 95% of the autoignition temperature, even more preferably no more than about 90% of the autoignition temperature, and even more preferably no more than about 85% of the autoignition temperature. The additive, or a selected component thereof, is contacted with the redirected flue gas 300 at a point upstream of the point of contact with the coal feed 200. The particle size of the additive, or component thereof, is small enough to be entrained in the flue gas 300.

In a preferred configuration, the temperature of the flue gas 300 is at least the thermal decomposition temperature for a compound containing a selected additive component, whereby at least most of the selected additive component decomposes into a vapor-phase element in the flue gas 300. The thermal decomposition of the component into the flue gas 300 effects a more uniform distribution of the component on the feed coal 200. By way of example, in the configuration of FIG. 3 the selected additive component is a halogen-containing material, such as a halide salt. The temperature of the flue gas 300 is greater than the thermal decomposition temperature of the halogen-containing compound, e.g., halide salt. When the flue gas 300 has a temperature above the thermal decomposition temperature, the speciated chlorine and/or bromine in the halogen-containing material 304 will form vapor phase elemental chlorine and/or bromine, respectively.

When the flue gas 300 contacts the coal feed 200, at least most of the vapor phase elemental halogens will precipitate onto the surfaces of the coal particles, which are at a lower temperature than the flue gas 300. When the additive metal is present, the vapor phase elemental halogen will typically deposit as a compound with the additive metal. For example, when iron is the additive metal, the precipitate will be a compound of the form $FeCl_2$ or $FeBr_2$. Preferably, for optimal results the coal particles, at the point of contact with the flue gas 300, are at a temperature less than the flue gas temperature and even more preferably less than the thermal decomposition temperature of the halogen. The remaining component(s) of the additive, for example the additive metal, is entrained and/or vaporized in the flue gas 300. Alternatively, the remaining component(s) may also be added to the coal feed 200 independently of the halogen-containing material 304.

For example, the remaining component(s) may be added upstream or downstream of the point of contact with the flue gas 300.

In another configuration, the halogen-containing material 304, and optionally additive metal, is sprayed, in liquid form, into the redirected flue gas 300. The carrier liquid quickly volatilizes, leaving the halogen-containing material, and optionally additive metal, entrained, in particulate form, in the flue gas 300. Although sublimation is referenced in the prior configuration, it is to be understood that the additive transportation system of FIG. 3 is not limited to sublimation of an additive component. It may be used where the various additive components are entrained as fine particles in the flue gas 300.

After contact with the flue gas 300, the coal feed 200 is fed to the mill 308 and is reduced to a preferred size distribution. Depending upon the final (comminuted) size distribution, the coal feed 200 is crushed in crusher 312 and/or pulverized in pulverizer 316.

Experimental

A trial of coal blending of a western bituminous coal with a Powder River Basin (PRB) subbituminous coal at a power plant was a particular starting point for the additive formulations of the present invention. The plant employed a spray dryer (SDA) for control of sulfur oxides followed by a baghouse for particulate control While firing 100% PRB coal at the plant, the baseline mercury removal was less than 10%. Blending 14% of the western bituminous coal with the Powder River Basin coal resulted in overall mercury capture efficiency of 81%. The HCl concentration in the flue gas was increased due to higher coal chlorine content in the western bituminous coal. However, the SDA also scrubs HCl, so the estimated HCl concentration downstream of the SDA was equivalent to the HCl concentration upstream of the SDA while firing 100% PRB coal. The plant fly ash is a mixture of high calcium (lime) spray dryer solids and an alkaline PRB fly ash (modified by the western bituminous coal). Unburned carbon was found to be low and activated carbon sorbents were not utilized during the coal blending tests. Therefore, the mercury was captured onto the filtered PRB fly ash with spray dryer solids.

According to EPA's Information Collection Request (ICR), units firing 100% PRB coal and configured with baghouses achieve an average of 80% mercury removal. Therefore, a coarse analysis may indicate that the mercury removal across the baghouse at the plant could be attributed to the increase in chlorine alone. However, tests conducted to increase the mercury removal on plants firing PRB coal and configured with SDAs by increasing the HCl content in the gas through halide salt addition to the boiler indicate that much higher levels of HCl are required than were achieved during coal blending tests at the plant.

Based on the above trial, it was postulated that the results could not be the result of only higher HCl and HBr content alone and that the measurement of speciated mercury upstream of the spray dryer did not support oxidation upstream of the spray dryer. Possible mercury oxidation reaction mechanisms were considered that might account for the observed mercury oxidation and overall 80% capture of mercury in a relatively low HCl and HBr flue gas and a majority mercury species of Hg°. The most likely explanation was an analog to the Deacon process reaction in which HCl and HBr are broken down to release elemental chlorine within the ash cake. The elemental chlorine and bromine then react with Hg(°) to yield oxidized mercuric chloride ($HgCl_2^{++}$) or mercuric bromide ($HgBr_2^{++}$) (and/or other oxidized mercury chlorides and bromides). The $HgCl_2^{++}$ and ($HgBr_2^{++}$) can then be chemisorbed onto the high calcium, alkaline ash surface without the need for activated carbon sorbent or for LOI carbon due to the presence of unreacted lime spray dryer solids in combination with the alkaline ash. The particular clue that a catalytic formation of chlorine and bromine could be involved was a high iron content of the bituminous coal (>6.5% reported as $Fe_2O_3$) that resulted in a significantly higher iron content in the flue gas compared to PRB-only fly ash. This scenario or a similar catalyst-promoted heterogenous mercury oxidation entirely within the ash filter cake of the baghouse at the plant was the starting point for the additive of the present invention. A catalyst transported into the filtercake could provide the same effect as the reactive ash formed by the blend of bituminous coal with the PRB coal. Chemical modeling of mercury oxidation in coal combustion supported the supposition that transition metal oxides and chlorides behave as reaction catalysts. The exact sequence of reactions and mechanisms is still in question.

Halide additives to iron coal additive formulations were considered as a combined mercury control and freeze conditioning agents. Subsequently, it was determined that a number of halide formulations would serve in this capacity and that they would also be useful as dust control agents. It was further determined that the combined use of iron addition to the additive coal feed combined with supplemental halide addition could be highly beneficial. Supplemental iron in the coal feed reports to the bottom ash and to the fly ash as iron oxides. The supplemental halides thermally decompose in the furnace and form primarily HCl or HBr with a small fraction of vaporized molecular halogens ($Cl_2$ and $Br_2$). The iron-enriched fly ash can promote catalytic mercury oxidation and sorption at the fly ash surface with supplemental halogens, if native halogen is insufficient. Unburned carbon in fly ash in amounts more than 5% is preferable to provide reactive surface area to bind the carbon.

It was further considered to inject oxidizing additives upstream of a baghouse for an APC train with baghouse and wet FGD scrubber. This configuration is being constructed for a number of new plants. Mercury control is expected to be accomplished by capture of oxidized mercury in the wet scrubber (Hg° is not water soluble). Further research is being conducted into specialized mercury oxidation additives that can be introduced upstream of the fabric filter to oxidize mercury as it passes through the filter cake. The use of activated carbon sorbents or ammoniated materials is not applicable because the fly ash must remain usable for concrete admixture. Materials of this invention, including ferric and cupric chloride and ferric nitrate, are expected to be suitable for this application.

Two full-scale mercury control trials with iron and halogen addition to the coal feed of cyclone boilers firing PRB coal were also performed.

Example 1

A four-day test was conducted on a coal-fired power plant with cyclone boilers firing Powder River Basin coal at a rate of 31.tons/hour. Baseline mercury emission as measured by EPA Method 324 (Sorbent Tube Method) over triplicate two-hour runs averaged 3.4 ug/dscm. The hopper fly ash bromine content for baseline conditions without additive was 21 ppmw. A combined additive consisting of an iron containing material with 98% ferric oxide content coated with a bromine containing alkaline salt was mixed into the coal feed. The addition rate was 5 lbs iron oxide per ton of coal and 0.06 pounds of bromine per ton of coal. The bromine increase in the flue gas was equivalent to a concentration of 15 ppmv.

Unburned carbon from the first ESP collection field averaged 38.8% by weight of the total fly ash. The unburned carbon percentage in the front ESP field is biased high compared to unit average carbon due to preferential precipitation of the unburned carbon in the front field. Under these conditions with the additive in the coal the mercury emission at the unit stack was 0.37 µg/dscm for a 3 hour test. The fly ash mercury content was measured to be 1.78 ppmw. The fly ash bromine was measured to be 445 ppmw indicating that most of the added halogen reported to the ash. Bromine was not detected in the stack emissions during the additive injection based on two stack tests via the EPA Method 26A test method and was measured at 0.019 ug/dscm, slightly above the detection limit, during a third test. Total mercury removal relative to baseline was 89.1%.

Example 2

A multi-week test was conducted on a 150 MW coal fired power plant configured with cyclone furnaces and an electrostatic precipitator for particulate emission control. Each unit fired a Powder River Basin coal at an average rate of 89.2 tons/hour during full load. An iron containing material with 98% ferric oxide was added to the coal feed. The addition rate was 12.5 lbs iron oxide per ton of coal. In this instance, iron enrichment was required even during the baseline in order to control the slag viscosity while firing PRB coal. The baseline mercury emission on one of the two units as measured by EPA Method 324 (Sorbent Trap Method) over triplicate two-hour runs averaged 1.1 µg/dscm.

Unburned carbon from the first ESP collection field averaged 43% by weight of the total fly ash collected from the first field. The unburned carbon percentage in the front ESP field is biased high compared to unit average carbon due to preferential precipitation of the unburned carbon in the front field.

A combined additive consisting of an iron containing material with 98% ferric oxide content coated with a bromine containing alkaline salt was mixed into the coal feed. The addition rate was 12.5 lbs iron per ton of coal and 0.08 pounds of bromine per ton of coal. The bromine increase in the flue gas was equivalent to a concentration of 21 ppmv.

With the combined additive in the coal the mercury emission at the unit stack averaged 0.21 m/dscm over a two-day period. The average mercury removal relative to baseline was 81%. The baseline mercury emission was notably low (1.1 µg/dscm concentration) compared to typical PRB plants. This was a result of the supplemental iron in the fly ash during baseline in combination with the high-unburned carbon content of the fly ash.

A number of variations and modifications of the invention can be used. It would be possible to provide for some features of the invention without providing others.

For example in one alternative embodiment, the different components of the additive can be added to the coal feed and/or flue gas at different locations and in different forms. For example, the halogen-containing material can be added, in the form of a halide or elemental halogen, to the coal feed 200 while the additive metal-containing material can be added to the flue gas downstream of the furnace 208 in the form of an oxide.

In another alternative embodiment, the additive is used for carbonaceous combustion feed materials other than coal. The additive may be used for mercury control, for example, in high-temperature plants, such as waste incineration plants, for example, domestic waste, hazardous waste, and sewage incineration plants, cement burning plants or rotary kilns, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A flue gas treatment method, comprising:
(a) providing a coal feed, the coal feed having a Loss on Ignition ("LOI") of at least about 10% and comprising mercury, alkali, and iron, wherein an iron content of the coal feed is less than about 10 wt. % (dry basis of the ash) as $Fe_2O_3$, the alkali content of the coal feed is at least about 20 wt. % (dry basis of the ash) alkali, and wherein the coal feed comprises no more than about 500 ppm halogens;
(b) contacting the coal feed, prior to combustion, with an additive, the additive comprising a transition metal and a halogen, wherein the additive promotes oxidation of elemental mercury wherein the additive comprises no more than about 1 wt. % carbon and no more than about 0.5 wt. % (dry basis) sulfur;
(c) combusting, by a wet bottom boiler, the coal feed to form a flue gas comprising elemental mercury derived from the mercury in the coal feed and fly ash; and
(d) collecting the oxidized mercury and fly ash to provide a treated flue gas, wherein:
the additive further comprises a mineralizer;
the mineralizer is zinc oxide; and
the additive comprises at least about 1 wt. % (dry basis) mineralizer.

2. The method of claim 1, wherein the coal feed comprises at least about 20 wt. % (dry basis of the ash) alkali, and no more than about 25 ppm (dry basis of the coal) bromine.

3. The method of claim 1, wherein the coal feed comprises no more than about 100 ppm (dry basis of the coal) chlorine and no more than about 10 ppm (dry basis of the coal) bromine.

4. The method of claim 1, wherein the coal feed has a phosphorus content ranging from about 0.1 to about 1.5 wt. % (dry basis of the ash) and wherein the coal feed is a low sulfur coal.

5. The method of claim 1, wherein the coal feed comprises at least about 15 wt. % calcium as CaO (dry basis of the ash), and wherein the coal feed comprises no more than about 100 ppm halogens.

6. The method of claim 1, wherein step (b) comprises the sub-steps:
   redirecting a portion of the flue gas stream;
   contacting the redirected portion of the flue gas stream with the additive, wherein the
   additive is transported by the redirected portion of the flue gas stream; and
   thereafter contacting the coal feed with the redirected portion of the flue gas stream, the redirected portion of the flue gas stream comprising the additive, wherein the additive is combined with the coal feed.

7. The method of claim 6, wherein the temperature of the redirected flue gas portion, in the thereafter contacting step, is greater than a temperature of the coal feed prior to the thereafter contacting step and wherein the redirected flue gas portion is input into a furnace along with the coal feed and additive.

8. The method of claim 6, wherein the redirected flue gas portion has a temperature, in the contacting step, greater than a sublimation temperature of at least one component of the additive and wherein at least one component of the additive sublimes into the redirected flue gas portion in the thereafter contacting step.

9. The method of claim 8, wherein a temperature of the redirected flue gas portion is less than an auto-ignition temperature of the coal feed.

10. The method of claim 9, wherein the sublimation temperature is the sublimation temperature of the halogen.

11. A flue gas treatment method, comprising:
   (a) providing a coal feed, the coal feed having a Loss on Ignition ("LOI") of at least about 10% and comprising mercury and iron, wherein an iron content of the coal feed is less than about 10 wt. % (dry basis of the ash);
   (b) combusting the coal feed to form a flue gas comprising elemental mercury derived from the mercury in the coal feed and fly ash;
   (c) contacting an additive with (i) the coal feed, prior to step (b), and/or (ii) the flue gas resulting from step (b), the additive comprising a transition metal and at least one of a halogen, wherein the additive comprises no more than about 1 wt. % carbon, wherein the additive comprises no more than about 0.5 wt. % (dry basis) sulfur, wherein, in either option (i) or (ii), the additive promotes post-combustion oxidation of the elemental mercury; and
   (d) collecting the oxidized mercury and fly ash to provide a treated flue gas, wherein:
   the additive comprises:
      (a) at least about 50 wt. % (dry basis) iron;
      (b) at least about 1 wt. % (dry basis) halogens; and
      (c) a mineralizer.

12. The method of claim 11, wherein at least some of the halogens are present as inter-halogen compounds.

13. The method of claim 11, wherein at least some of the halogens are present as halides, the halides comprising iron.

14. The method of claim 11, wherein the additive composition is in contact with the coal feed and wherein the coal feed is a high alkali and low sulfur coal.

15. The method of claim 11, wherein the coal feed comprises at least about 20 wt. % (dry basis of the ash) alkali, and no more than about 25 ppm (dry basis of the coal) bromine.

16. The method of claim 11, wherein the coal feed comprises no more than about 100 ppm (dry basis of the coal) chlorine and no more than about 10 ppm (dry basis of the coal) bromine.

17. The method of claim 11, wherein the coal feed has a phosphorus content ranging from about 0.1 to about 1.5 wt. % (dry basis of the ash) and wherein the coal feed is a low sulfur coal.

18. The method of claim 11, wherein the coal feed comprises at least about 15 wt. % calcium as CaO (dry basis of the ash), and wherein the coal feed comprises no more than about 100 ppm halogens.

19. The method of claim 11, wherein step (c) comprises the sub-steps:
   redirecting a portion of the flue gas stream;
   contacting the redirected portion of the flue gas stream with the additive, wherein the additive is transported by the redirected portion of the flue gas stream; and
   thereafter contacting the coal feed with the redirected portion of the flue gas stream, the redirected portion of the flue gas stream comprising the additive, wherein the additive is combined with the coal feed.

20. The method of claim 19, wherein the temperature of the redirected flue gas portion, in the thereafter contacting step, is greater than a temperature of the coal feed prior to the thereafter contacting step and wherein the redirected flue gas portion is input into a furnace along with the coal feed and additive.

21. The method of claim 19, wherein the redirected flue gas portion has a temperature, in the contacting step, greater than a sublimation temperature of at least one component of the additive and wherein at least one component of the additive sublimes into the redirected flue gas portion in the thereafter contacting step.

22. The method of claim 21, wherein a temperature of the redirected flue gas portion is less than an auto-ignition temperature of the coal feed.

23. The method of claim 22, wherein the sublimation temperature is the sublimation temperature of the halogens.

* * * * *